United States Patent
Marshall et al.

(10) Patent No.: US 12,314,703 B2
(45) Date of Patent: May 27, 2025

(54) SECURE VEHICLE SOFTWARE UPDATES VIA PRIVATE NETWORK

(71) Applicant: Mercedes-Benz Group AG, Stuttgart (DE)

(72) Inventors: Chet Marshall, Kirkland, WA (US); Nashon Steffen, Snohomish, WA (US); Jeremy Stowe, Lake Tapps, WA (US)

(73) Assignee: Mercedes-Benz Group AG, Stuttgart (DE)

( * ) Notice: Subject to any disclaimer, the term of this patent is extended or adjusted under 35 U.S.C. 154(b) by 209 days.

(21) Appl. No.: 18/346,527

(22) Filed: Jul. 3, 2023

(65) Prior Publication Data

US 2025/0013452 A1    Jan. 9, 2025

(51) Int. Cl.
   *G06F 8/65*     (2018.01)
   *B60W 50/06*    (2006.01)
   *G06F 21/57*    (2013.01)

(52) U.S. Cl.
   CPC ............... *G06F 8/65* (2013.01); *B60W 50/06* (2013.01); *G06F 21/572* (2013.01); *B60W 2556/45* (2020.02); *G06F 2221/033* (2013.01)

(58) Field of Classification Search
   CPC . B60W 50/06; B60W 2556/45; G06F 21/572; G06F 2221/033
   See application file for complete search history.

(56) References Cited

U.S. PATENT DOCUMENTS 10,936,302 B2 *   3/2021   Eklund ................. H04L 9/0637
2017/0024201 A1 * 1/2017   Diedrich .................... G06F 8/65
(Continued)

FOREIGN PATENT DOCUMENTS

CN    111949299 A  * 11/2020  ............... G06F 8/65
CN    114286318 A  *  4/2022
CN    115421753 A  * 12/2022

OTHER PUBLICATIONS

Buschlinger et al., "Plug-and-patch: secure value added services for electric vehicle charging", In proceedings of the 14th International Conference on Availability, Reliability and Security, Aug. 26-29, 2019, Canterbury, United Kingdom, 10 pages.
(Continued)

*Primary Examiner* — Phillip H Nguyen
(74) *Attorney, Agent, or Firm* — Dority & Manning, P.A.

(57) ABSTRACT

A computing system for providing OTA updates at a charge station or other location can include a local cache storage; a communications system configured to establish a private cellular network associated with a particular location; and a control circuit. The control circuit can be configured to: obtain an OTA software package from an OTA update server over a public cellular network; store the OTA software package at the local cache storage at the particular location; determine that a vehicle has connected to the private cellular network; in response to determining that the vehicle has connected to the private cellular network, determine whether the vehicle is eligible for the OTA software package stored at the local cache storage; and provide, over the private cellular network, the OTA software package stored at the local cache storage to the vehicle based on determining that the vehicle is eligible for the OTA software package.

20 Claims, 10 Drawing Sheets

(56) References Cited

U.S. PATENT DOCUMENTS

2019/0187971 A1* 6/2019 Wang .................... H04W 12/06
2021/0191391 A1* 6/2021 Menon ................. G05D 1/0022
2022/0335130 A1* 10/2022 Zhu ........................ G06F 21/44

OTHER PUBLICATIONS

ISO 15118-8:2020, "Vehicle to grid communication interface—Part 8: Physical layer and data link layer requirements for wireless communication", 2020, 43 pages.

* cited by examiner

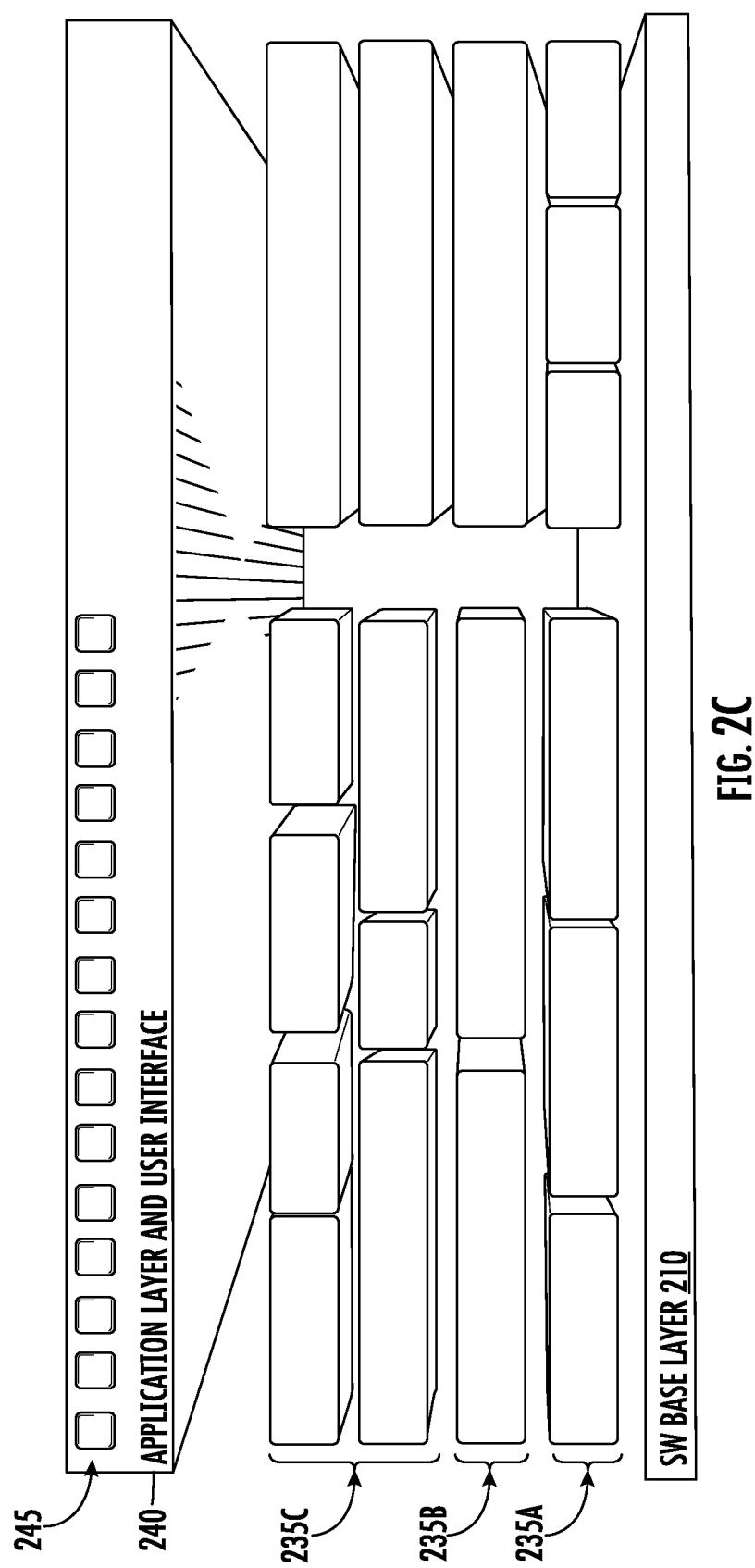

800

805 — OBTAIN AN OTA SOFTWARE PACKAGE FROM AN OTA UPDATE SERVER OVER A PUBLIC CELLULAR NETWORK

810 — STORE THE OTA SOFTWARE PACKAGE AT A LOCAL CACHE STORAGE AT A PARTICULAR LOCATION

815 — DETERMINE THAT A VEHICLE HAS CONNECTED TO A PRIVATE CELLULAR NETWORK ASSOCIATED WITH THE PARTICULAR LOCATION

820 — DETERMINE WHETHER THE VEHICLE IS ELIGIBLE FOR THE OTA SOFTWARE PACKAGE STORED AT THE LOCAL CACHE STORAGE

825 — PROVIDE, OVER THE PRIVATE CELLULAR NETWORK, THE OTA SOFTWARE PACKAGE STORED AT THE LOCAL CACHE STORAGE TO THE VEHICLE

830 — OBTAIN, OVER THE PRIVATE CELLULAR NETWORK, A CONFIRMATION THAT THE VEHICLE HAS IMPLEMENTED THE OTA SOFTWARE PACKAGE

835 — PROVIDE, TO UPDATE A SHADOW RECORD OF THE VEHICLE, DATA INDICATING THAT THE VEHICLE HAS IMPLEMENTED THE OTA SOFTWARE PACKAGE

FIG. 8

SECURE VEHICLE SOFTWARE UPDATES VIA PRIVATE NETWORK

FIELD

The present disclosure relates generally to vehicle systems. More particularly, the present disclosure relates to providing secure vehicle software updates via private network(s).

BACKGROUND

A vehicle may include one or more onboard vehicle systems that provide various functionality for the vehicle. The vehicle may communicate with a backend system to perform over-the-air (OTA) updates to vehicle systems. The OTA updates may be downloaded over a cellular network from a network provider.

SUMMARY

Aspects and advantages of implementations of the present disclosure will be set forth in part in the following description, or may be learned from the description, or may be learned through practice of the implementations.

For example, in an aspect, a computer-implemented method may include obtaining an OTA software package from an OTA update server over a public cellular network. The computer-implemented method may include storing the OTA software package at a local cache storage at a particular location. The computer-implemented method may include determining that a vehicle has connected to a private cellular network associated with the particular location. The computer-implemented method may include, in response to determining that the vehicle has connected to the private cellular network associated with the particular location, determining whether the vehicle is eligible for the OTA software package stored at the local cache storage. The computer-implemented method may include providing, over the private cellular network, the OTA software package stored at the local cache storage to the vehicle based on determining that the vehicle is eligible for the OTA software package.

In an embodiment, determining that the vehicle is eligible for the OTA software package stored at the local cache storage can include: receiving a software update request from the vehicle over the private cellular network; and determining whether the software update request is associated with the OTA software package.

In an embodiment, the method further includes, in response to determining that the software update request is not associated with the OTA software package, redirecting the software update request to the OTA update server over the public cellular network.

In an embodiment, the OTA software package is a first OTA software package, and the method further includes: obtaining a second OTA software package over the public cellular network; storing the second OTA software package at the local cache storage at the particular location; and providing, over the private cellular network, the second OTA software package to the vehicle.

In an embodiment, the particular location is a charging station, the private cellular network is established by a charging station edge server at the charging station, and the charging station edge server is configured to communicate with vehicles entering the charging station.

In an embodiment, the method includes initiating charging of the vehicle; determining a time-to-charge for the vehicle; and determining whether to provide the OTA software package to the vehicle over the private cellular network based on the time-to-charge for the vehicle.

In an embodiment, the method further includes obtaining, over the private cellular network, vehicle data from the vehicle.

In an embodiment, the vehicle data includes error data associated with the vehicle.

In an embodiment, the OTA software package is associated with a vehicle model, and determining whether the vehicle is eligible for the OTA software package stored at the local cache storage includes: receiving a vehicle identifier from the vehicle, the vehicle identifier uniquely associated with the vehicle; determining a vehicle model associated with the vehicle based on the vehicle identifier; and determining that vehicle is eligible for the OTA software package based on the vehicle model being associated with the vehicle and the OTA software package.

In an embodiment, the vehicle identifier can include at least one of a Vehicle Identification Number (VIN) or a Globally Unique Identifier (GUID), and determining the vehicle model associated with the vehicle based on the vehicle identifier includes looking up the vehicle model associated with the vehicle identifier in a vehicle database.

In an embodiment, the method further includes obtaining, over the private cellular network, a confirmation that the vehicle has implemented the OTA software package; and providing, to update a shadow record of the vehicle, data indicating that the vehicle has implemented the OTA software package.

In an embodiment, the public cellular network and the private cellular network share one or more SIM profile attributes such that communications with the private cellular network are prioritized over communications with a public cellular network.

In an embodiment, the vehicle includes an embedded SIM (eSIM).

In an embodiment, the private cellular network is a radio access network (RAN).

For example, in an aspect, a computing system includes a local cache storage. The computing system includes a communications system configured to establish a private cellular network associated with a particular location. The computing system includes a control circuit. The control circuit is configured to obtain an OTA software package from an OTA update server over a public cellular network. The control circuit is configured to store the OTA software package at the local cache storage at the particular location. The control circuit is configured to determine that a vehicle has connected to the private cellular network. The control circuit is configured to, in response to determining that the vehicle has connected to the private cellular network, determine whether the vehicle is eligible for the OTA software package stored at the local cache storage. The control circuit is configured to provide, over the private cellular network, the OTA software package stored at the local cache storage to the vehicle based on determining that the vehicle is eligible for the OTA software package.

In an embodiment, determining that the vehicle is eligible for the OTA software package stored at the local cache storage includes: receiving a software update request from the vehicle over the private cellular network; and determining whether the software update request is associated with the OTA software package.

In an embodiment, the public cellular network and the private cellular network share one or more SIM profile attributes such that communications with the private cellular network are prioritized over communications with a public cellular network.

In an embodiment, the vehicle includes an embedded SIM (eSIM) having the one or more SIM profile attributes.

In an embodiment, the control circuit is configured to: initiate charging of the vehicle; determine a time-to-charge for the vehicle; and determine whether to provide the OTA software package to the vehicle over the private cellular network based on the time-to-charge for the vehicle.

For example, in an aspect, one or more non-transitory computer-readable media can store instructions that are executable by a control circuit. The instructions are executable by the control circuit to obtain an OTA software package from an OTA update server over a public cellular network. The instructions are executable by the control circuit to store the OTA software package at the local cache storage at the particular location. The instructions are executable by the control circuit to determine that a vehicle has connected to the private cellular network. The instructions are executable by the control circuit to, in response to determining that the vehicle has connected to the private cellular network, determine whether the vehicle is eligible for the OTA software package stored at the local cache storage. The instructions are executable by the control circuit to provide, over the private cellular network, the OTA software package stored at the local cache storage to the vehicle based on determining that the vehicle is eligible for the OTA software package.

Other example aspects of the present disclosure are directed to other systems, methods, vehicles, apparatuses, tangible non-transitory computer-readable media, and devices for the technology described herein.

These and other features, aspects, and advantages of various implementations will become better understood with reference to the following description and appended claims. The accompanying drawings, which are incorporated in and constitute a part of this specification, illustrate implementations of the present disclosure and, together with the description, serve to explain the related principles.

BRIEF DESCRIPTION OF THE DRAWINGS

Detailed discussion of implementations directed to one of ordinary skill in the art are set forth in the specification, which makes reference to the appended figures, in which:

FIGS. 2A-D illustrate diagrams of an example computing architecture for an onboard computing system of a vehicle according to an embodiment hereof.

FIG. 8 illustrates a flowchart diagram of an example method according to an embodiment hereof.

DETAILED DESCRIPTION

Figure 1:
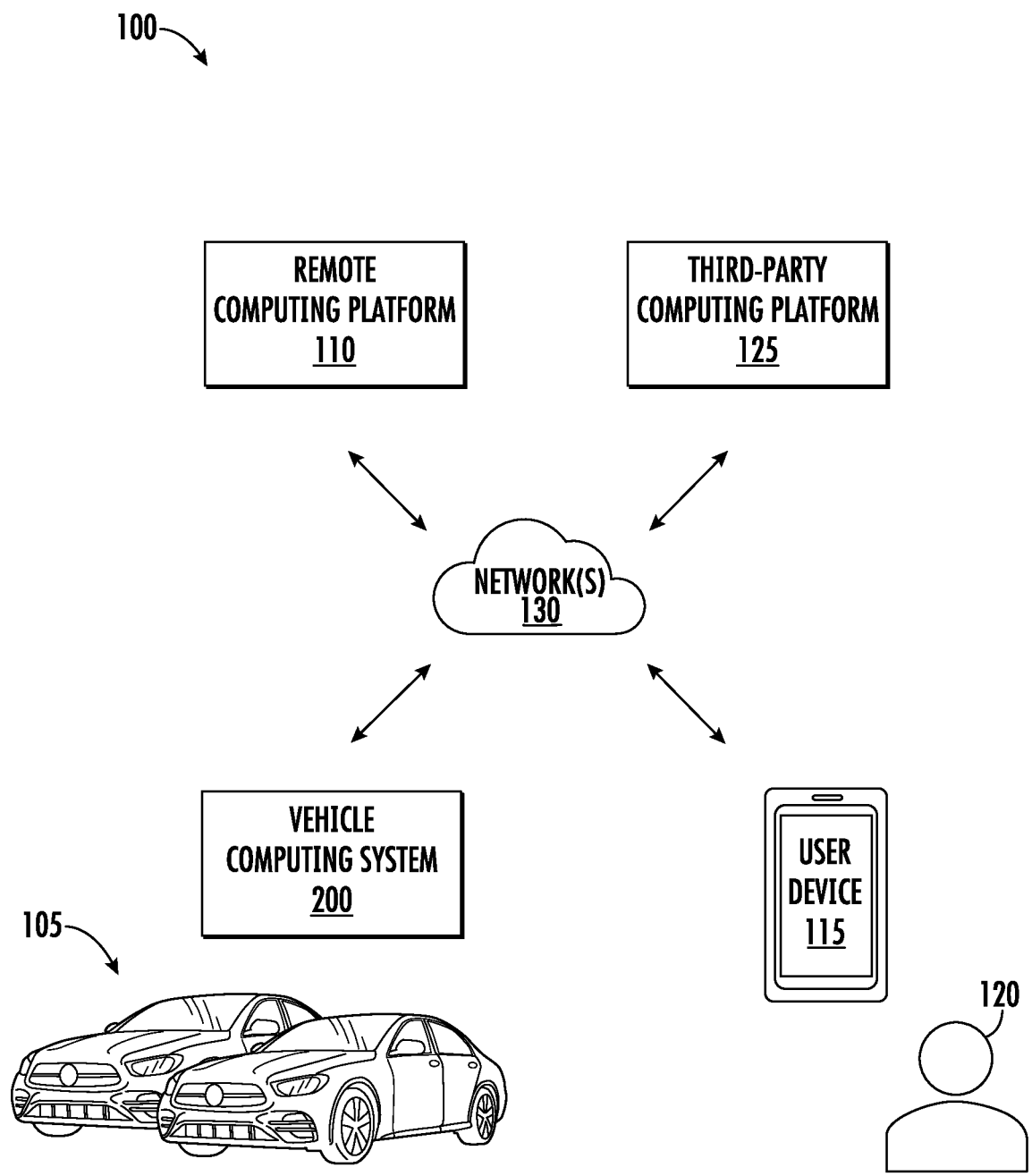
FIG. 1 illustrates an example computing ecosystem according to an embodiment hereof.

Generally, the present disclosure relates to providing secure vehicle software updates via private network(s). A vehicle can communicate with a backend system to receive over-the-air (OTA) updates to various firmware or software systems onboard the vehicle. For example, an application on a vehicle's infotainment system may be updated to a newer version, may receive new or updated content, or may otherwise update software to improve functionality of the system. To download the OTA updates, the vehicle may connect to a public network, such as a cellular network. For instance, the vehicle may have a communications module configured to connect to a public network (e.g., public internet) to download the OTA updates.

However, downloading OTA updates over a public network across a public network for a fleet of vehicles can consume a significant amount of network resources on the public network. The use of public networks to perform OTA updates can contribute to increased costs to vehicle fleet managers or manufacturers associated with operating or leasing the network resources or congestion on the public network.

To solve these and other problems, the present disclosure provides for leveraging a private network to perform OTA updates at a vehicle. An edge server at a particular location (e.g., a charging station for an electric vehicle) can obtain an OTA software package from an OTA update server over a public cellular network. The edge server can store the OTA software package at a local cache storage. Additionally, the edge server can broadcast a private network (e.g., a radio access network). When the vehicle connects to the private network, the edge server can determine whether the vehicle is eligible for the OTA software package stored at the local cache storage. If the vehicle is eligible, the edge server can transmit the OTA software package to the vehicle to perform an OTA update.

A vehicle can connect to the public network (e.g., a public cellular network) using a communication system such as a communications module including a SIM card or eSIM card. However, the private network may be configured such that the vehicle may connect to the private network instead of the public network when the vehicle is in range of the private network. As one example, the private network and the public network can share a common SIM profile (e.g., a common eSIM profile). This can provide for the vehicle to utilize the technology of the present disclosure without requiring any additional configuration. For instance, vehicles that can already connect to the public network can be updated using the private network without requiring any changes to configuration at the vehicles. This, in turn, can provide for the technology of the present disclosure to be implemented by an entity managing the vehicles without disruption to the users or operators of the vehicles.

Example aspects of the present disclosure can provide a number of technical effects and benefits, including improvements to computing technologies. As one example, the use of a private network to communicate an OTA software package stored locally at a local cache store to a vehicle over the private network can reduce usage of network resources on a public network. Generally, the public network resources can be more contested or more expensive to utilize, so reducing the network resource usage at the public network can improve the overall functioning of the network or contribute to reduced cost for providers of the OTA software package. Furthermore, the use of a private network having a common network profile to the public network can provide for improved distribution of OTA updates without disruption to a fleet of vehicles configured to communicate over the public network. This can provide for improved backwards compatibility with existing vehicles or reduce computing resource usage associated with updating communication settings at the vehicles to connect over the private network.

Example aspects of the present disclosure can also provide improved security or efficiency in interfacing with vehicle computing systems for providing OTA software updates. For instance, the present disclosure can provide for direct interfacing between an edge server at a particular location frequently utilized by a particular class, make, or other set of vehicles (e.g., vehicles of a particular make at a dealership for that make, electric vehicles at a charging station, etc.) such that the local data cache can be optimized for that set of vehicles. As an example, a dealership can store OTA software packages for only vehicles produced by certain manufacturer(s). As another example, a charging station operated by a vehicle manufacturer can store OTA software packages for only that manufacturer's fleet of electric vehicles. This can provide for fewer computing resources to be allocated to storing OTA software requests associated with other types of vehicles that are not frequently present at that particular location. Additionally, if the edge server services only a particular manufacturer or manufacturers of vehicles, proprietary security (e.g., encryption) can be utilized between the edge server and the vehicle, which can reduce vulnerabilities associated with downloading OTA software updates over a public cellular network.

The technology of the present disclosure may include the collection of data associated with a user in the event that the user expressly authorizes such collection. Such authorization may be provided by the user via explicit user input to a user interface in response to a prompt that expressly requests such authorization. Collected data may be anonymized, pseudonymized, encrypted, noised, securely stored, or otherwise protected. A user may opt out of such data collection at any time.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations may be made to the embodiments without departing from the scope or spirit of the present disclosure. For instance, features illustrated or described as part of one embodiment may be used with another embodiment to yield a still further embodiment. Thus, it is intended that aspects of the present disclosure cover such modifications and variations.

FIG. 1 illustrates an example computing ecosystem 100 according to an embodiment hereof. The ecosystem 100 may include a vehicle 105, a remote computing platform 110 (also referred to herein as computing platform 110), and a user device 115 associated with a user 120. The user 120 may be a driver of the vehicle. In some implementations, the user 120 may be a passenger of the vehicle. In some implementations, the computing ecosystem 100 may include a third party (3P) computing platform 125, as further described herein. The vehicle 105 may include a vehicle computing system 200 located onboard the vehicle 105. The computing platform 110, the user device 115, the third party computing platform 125, or the vehicle computing system 200 may be configured to communicate with one another via one or more networks 130.

The systems/devices of ecosystem 100 may communicate using one or more application programming interfaces (APIs). This may include external facing APIs to communicate data from one system/device to another. The external facing APIs may allow the systems/devices to establish secure communication channels via secure access channels over the networks 130 through any number of methods, such as web-based forms, programmatic access via RESTful APIs, Simple Object Access Protocol (SOAP), remote procedure call (RPC), scripting access, etc.

The computing platform 110 may include a computing system that is remote from the vehicle 105. In an embodiment, the computing platform 110 may include a cloud-based server system. The computing platform 110 may be associated with (e.g., operated by) an entity. For example, the remote computing platform 110 may be associated with an OEM that is responsible for the make and model of the vehicle 105. In another example, the remote computing platform 110 may be associated with a service entity contracted by the OEM to operate a cloud-based server system that provides computing services to the vehicle 105. As one example, the computing platform 110 can provide over-the-air updates to the vehicle 105.

The computing platform 110 may include one or more back-end services for supporting the vehicle 105. The services may include, for example, tele-assist services, navigation/routing services, performance monitoring services, etc. The computing platform 110 may host or otherwise include one or more APIs for communicating data to/from a computing system 130 of the vehicle 105 or the user device 115.

The computing platform 110 may include one or more computing devices. For instance, the computing platform 110 may include a control circuit and a non-transitory computer-readable medium (e.g., memory). The control circuit of the computing platform 110 may be configured to perform the various operations and functions described herein. Further description of the computing hardware and components of computing platform 110 is provided herein with reference to other figures.

The user device 115 may include a computing device owned or otherwise accessible to the user 120. For instance, the user device 115 may include a phone, laptop, tablet, wearable device (e.g., smart watch, smart glasses, headphones), personal digital assistant, gaming system, personal desktop devices, other hand-held devices, or other types of mobile or non-mobile user devices. As further described herein, the user device 115 may include one or more input components such as buttons, a touch screen, a joystick or other cursor control, a stylus, a microphone, a camera or other imaging device, a motion sensor, etc. The user device 115 may include one or more output components such as a display device (e.g., display screen), a speaker, etc. In an embodiment, the user device 115 may include a component such as, for example, a touchscreen, configured to perform input and output functionality to receive user input and present information for the user 120. The user device 115 may execute one or more instructions to run an instance of a software application and present user interfaces associated therewith, as further described herein. In an embodiment, the launch of a software application may initiate a user-network session with the computing platform 110.

The third-party computing platform 125 may include a computing system that is remote from the vehicle 105, remote computing platform 110, and user device 115. In an embodiment, the third-party computing platform 125 may include a cloud-based server system. The term "third-party entity" may be used to refer to an entity that is different from the entity associated with the remote computing platform 110. For example, as described herein, the remote computing platform 110 may be associated with an OEM that is responsible for the make and model of the vehicle 105. The third-party computing platform 125 may be associated with a supplier of the OEM, a maintenance provider, a mapping service provider, an emergency provider, or other types of entities. In another example, the third-party computing platform 125 may be associated with an entity that owns, operates, manages, etc. a software application that is available to or downloaded on the vehicle computing system 200.

The third-party computing platform 125 may include one or more back-end services provided by a third-party entity. The third-party computing platform 125 may provide services that are accessible by the other systems and devices of the ecosystem 100. The services may include, for example, mapping services, routing services, search engine functionality, maintenance services, entertainment services (e.g., music, video, images, gaming, graphics), emergency services (e.g., roadside assistance, 911 support), or other types of services. The third-party computing platform 125 may host or otherwise include one or more APIs for communicating data to/from the third-party computing system 125 to other systems/devices of the ecosystem 100.

The networks 130 may be any type of network or combination of networks that allows for communication between devices. In some implementations, the networks 130 may include one or more of a local area network, wide area network, the Internet, secure network, cellular network, mesh network, peer-to-peer communication link or some combination thereof and may include any number of wired or wireless links. Communication over the networks 130 may be accomplished, for instance, via a network interface using any type of protocol, protection scheme, encoding, format, packaging, etc. In an embodiment, communication between the vehicle computing system 200 and the user device 115 may be facilitated by near field or short range communication techniques (e.g., Bluetooth low energy protocol, radio frequency signaling, NFC protocol). In some implementations, for example, the networks 130 can include a public cellular network.

The vehicle 105 may be a vehicle that is operable by the user 120. In an embodiment, the vehicle 105 may be an automobile or another type of ground-based vehicle that is manually driven by the user 120. For example, the vehicle 105 may be a Mercedes-Benz® car or van. In some implementations, the vehicle 105 may be an aerial vehicle (e.g., a personal airplane) or a water-based vehicle (e.g., a boat). The vehicle 105 may include operator-assistance functionality such as cruise control, advanced driver assistance systems, etc. In some implementations, the vehicle 105 may be a fully or semi-autonomous vehicle.

The vehicle 105 may include a powertrain and one or more power sources. The powertrain may include a motor (e.g., an internal combustion engine, electric motor, or hybrid thereof), e-motor (e.g., electric motor), transmission (e.g., automatic, manual, continuously variable), driveshaft, axles, differential, e-components, gear, etc. The power sources may include one or more types of power sources. For example, the vehicle 105 may be a fully electric vehicle (EV) that is capable of operating a powertrain of the vehicle 105 (e.g., for propulsion) and the vehicle's onboard functions using electric batteries. In an embodiment, the vehicle 105 may use combustible fuel. In an embodiment, the vehicle 105 may include hybrid power sources such as, for example, a combination of combustible fuel and electricity.

The vehicle 105 may include a vehicle interior. The vehicle interior may include the area inside of the body of the vehicle 105 including, for example, a cabin for users of the vehicle 105. The interior of the vehicle 105 may include seats for the users, a steering mechanism, accelerator interface, braking interface, etc. The interior of the vehicle 105 may include a display device such as a display screen associated with an infotainment system, as further described with respect to FIG. 3.

The vehicle 105 may include a vehicle exterior. The vehicle exterior may include the outer surface of the vehicle 105. The vehicle exterior may include one or more lighting elements (e.g., headlights, brake lights, accent lights). The vehicle 105 may include one or more doors for accessing the vehicle interior by, for example, manipulating a door handle of the vehicle exterior. The vehicle 105 may include one or more windows, including a windshield, door windows, passenger windows, rear windows, sunroof, etc.

The systems and components of the vehicle 105 may be configured to communicate via a communication channel. The communication channel may include one or more data buses (e.g., controller area network (CAN)), on-board diagnostics connector (e.g., OBD-II), or a combination of wired or wireless communication links. The onboard systems may send or receive data, messages, signals, etc. amongst one another via the communication channel.

In an embodiment, the communication channel may include a direct connection, such as a connection provided via a dedicated wired communication interface, such as a RS-232 interface, a universal serial bus (USB) interface, or via a local computer bus, such as a peripheral component interconnect (PCI) bus. In an embodiment, the communication channel may be provided via a network. The network may be any type or form of network, such as a personal area network (PAN), a local-area network (LAN), Intranet, a metropolitan area network (MAN), a wide area network (WAN), or the Internet. The network may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol.

In an embodiment, the systems/devices of the vehicle 105 may communicate via an intermediate storage device, or more generally an intermediate non-transitory computer-readable medium. For example, the non-transitory computer-readable medium 140, which may be external to the computing system 130, may act as an external buffer or repository for storing information. In such an example, the computing system 130 may retrieve or otherwise receive the information from the non-transitory computer-readable medium 140.

Certain routine and conventional components of vehicle 105 (e.g., an engine) are not illustrated or discussed herein for the purpose of brevity. One of ordinary skill in the art will understand the operation of conventional vehicle components in vehicle 105.

The vehicle 105 may include a vehicle computing system 200. As described herein, the vehicle computing system 200 includes a computing system onboard the vehicle 105. For example, the computing devices and components of the vehicle computing system 200 may be housed, located, or otherwise included on or within the vehicle 105. The vehicle computing system 200 may be configured to execute the computing functions and operations of the vehicle 105.

Figure 2A:
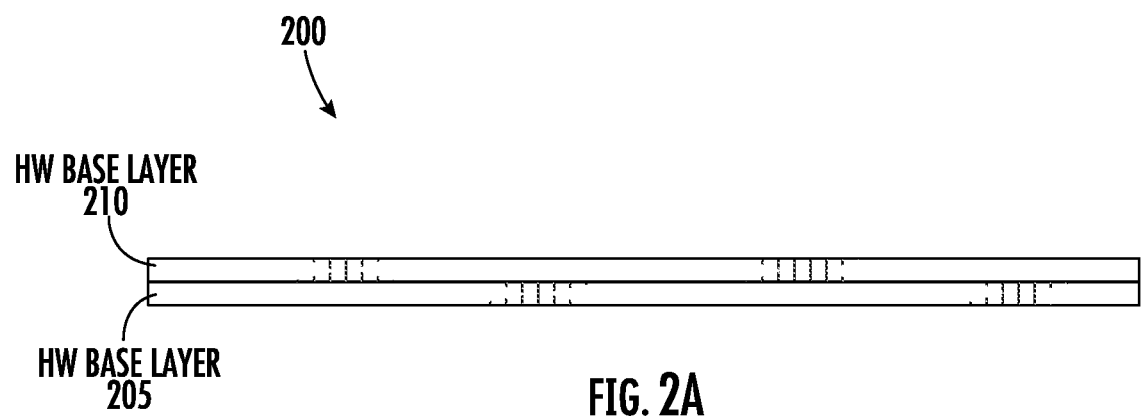

FIG. 2A illustrates an overview of an operating system of the vehicle computing system 105. The operating system may be a layered operating system. The vehicle computing system 200 may include a hardware layer 205 and a software layer 210. The hardware and software layers 205, 210 may include sub-layers. In some implementations, the operating system of the vehicle computing system 200 may include other layers (e.g., above, below, or in between those shown in FIG. 2A). In an example, the hardware layer 205 and the software layer 210 can be standardized base layers of the vehicle's operating system.

Figure 2B:
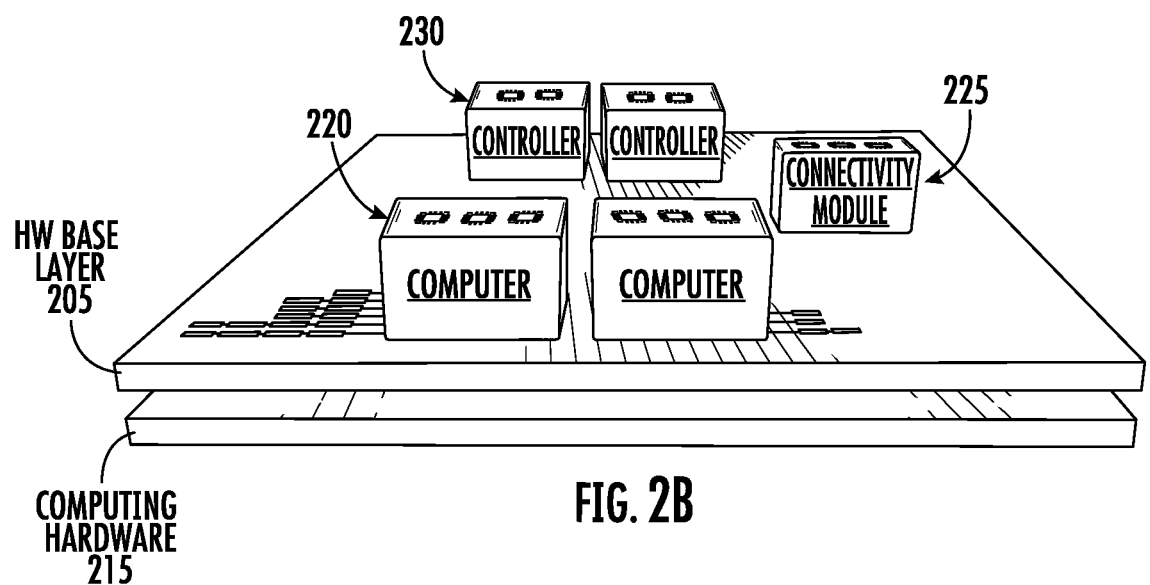

FIG. 2B illustrates a diagram of the hardware layer 205 of the vehicle computing system 200. In the layered operating system of the vehicle computing system 200, the hardware layer 205 can reside between the physical computing hardware 215 onboard the vehicle 105 and the software (e.g., of software layer 210) that runs onboard the vehicle 105.

The hardware layer 205 may be an abstraction layer including computing code that allows for communication between the software and the computing hardware 215 in the vehicle computing system 200. For example, the hardware layer 205 may include interfaces and calls that allow the vehicle computing system 200 to generate a hardware-dependent instruction to the computing hardware 215 (e.g., processors, memories, etc.) of the vehicle 105.

The hardware layer 205 may be configured to help coordinate the hardware resources. The architecture of the hardware layer 205 may be serviced oriented. The services may help provide the computing capabilities of the vehicle computing system 105. For instance, the hardware layer 205 may include the domain computers 220 of the vehicle 105, which may host various functionality of the vehicle 105 such as the vehicle's intelligent functionality. The specification of each domain computer may be tailored to the functions and the performance requirements where the services are abstracted to the domain computers. By way of example, this permits certain processing resources (e.g., graphical processing units) to support the functionality of a central in-vehicle infotainment computer for rendering graphics across one or more display devices for navigation, games, etc. or to support an intelligent automated driving computer to achieve certain industry assurances.

The hardware layer 205 may be configured to include a connectivity module 225 for the vehicle computing system 200. The connectivity module may include code/instructions for interfacing with the communications hardware of the vehicle 105. This can include, for example, interfacing with a communications controller, receiver, transceiver, transmitter, port, conductors, or other hardware for communicating data/information. The connectivity module 225 may allow the vehicle computing system 200 to communicate with other computing systems that are remote from the vehicle 105 including, for example, remote computing platform 110 (e.g., an OEM cloud platform). For instance, in some implementations, the connectivity module 225 can be configured with a SIM profile (e.g., an eSIM profile) facilitating communications with a public cellular network.

The architecture design of the hardware layer 205 may be configured for interfacing with the computing hardware 215 for one or more vehicle control units 225. The vehicle control units 225 may be configured for controlling various functions of the vehicle 105. This may include, for example, a central exterior and interior controller (CEIC), a charging controller, or other controllers as further described herein.

The software layer 205 may be configured to provide software operations for executing various types of functionality and applications of the vehicle 105. FIG. 2C illustrates a diagram of the software layer 210 of the vehicle computing system 200. The architecture of the software layer 210 may be service oriented and may be configured to provide software for various functions of the vehicle computing system 200. To do so, the software layer 210 may include a plurality of sublayers 235A-E. For instance, the software layer 210 may include a first sublayer 235A including firmware (e.g., audio firmware) and a hypervisor, a second sublayer 235B including operating system components (e.g., open-source components), and a third sublayer 235C including middleware (e.g., for flexible integration with applications developed by an associated entity or third-party entity).

The vehicle computing system 200 may include an application layer 240. The application layer 240 may allow for integration with one or more software applications 245 that are downloadable or otherwise accessible by the vehicle 105. The application layer 240 may be configured, for example, using container interfaces to integrate with applications developed by a variety of different entities.

Figure 2D:
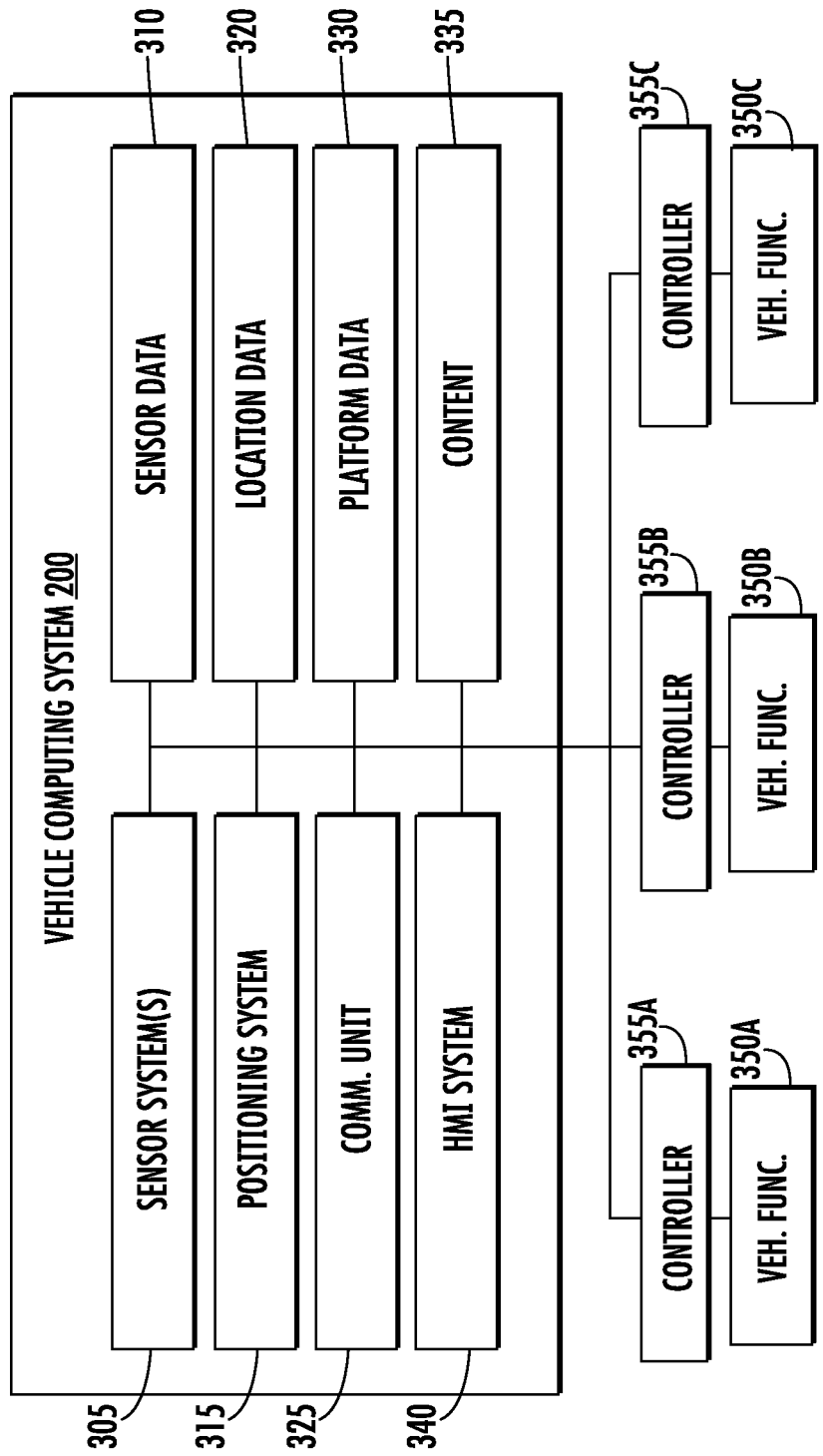

The layered operating system and the vehicle's onboard computing resources may allow the vehicle computing system 200 to collect and communicate data as well as operate the systems implemented onboard the vehicle 105. FIG. 2D illustrates a block diagram of example systems and data of the vehicle 105.

The vehicle 105 may include one or more sensor systems 305. A sensor system may include or otherwise be in communication with a sensor of the vehicle 105 and a module for processing sensor data 310 associated with the sensor configured to acquire the sensor data 305. This may include sensor data 310 associated with the surrounding environment of the vehicle 105, sensor data associated with the interior of the vehicle 105, or sensor data associated with a particular vehicle function. The sensor data 310 may be indicative of conditions observed in the interior of the vehicle, exterior of the vehicle, or in the surrounding environment. For instance, the sensor data 305 may include image data, inside/outside temperature data, weather data, data indicative of a position of a user/object within the vehicle 105, weight data, motion/gesture data, audio data, or other types of data. The sensors may include one or more: cameras (e.g., visible spectrum cameras, infrared cameras), motion sensors, audio sensors (e.g., microphones), weight sensors (e.g., for a vehicle a seat), temperature sensors, humidity sensors, Light Detection and Ranging (LIDAR) systems, Radio Detection and Ranging (RADAR) systems, or other types of sensors. The vehicle 105 may include other sensors configured to acquire data associated with the vehicle 105. For example, the vehicle 105 may include inertial measurement units, wheel odometry devices, or other sensors.

The vehicle 105 may include a positioning system 315. The positioning system 315 may be configured to generate location data 320 (also referred to as position data) indicative of a location (also referred to as a position) of the vehicle 105. For example, the positioning system 315 may determine location by using one or more of inertial sensors (e.g., inertial measurement units, etc.), a satellite positioning system, based on IP address, by using triangulation or proximity to network access points or other network components (e.g., cellular towers, Wi-Fi access points, etc.), or other suitable techniques. The positioning system 315 may determine a current location of the vehicle 105. The location may be expressed as a set of coordinates (e.g., latitude, longitude), an address, a semantic location (e.g., "at work"), etc.

In an embodiment, the positioning system 315 may be configured to localize the vehicle 105 within its environment. For example, the vehicle 105 may access map data that provides detailed information about the surrounding environment of the vehicle 105. The map data may provide information regarding: the identity and location of different roadways, road segments, buildings, or other items; the location and directions of traffic lanes (e.g., the location and direction of a parking lane, a turning lane, a bicycle lane, or other lanes within a particular roadway); traffic control data (e.g., the location, timing, or instructions of signage (e.g., stop signs, yield signs), traffic lights (e.g., stop lights), or other traffic signals or control devices/markings (e.g., cross walks)); or any other data. The positioning system 315 may localize the vehicle 105 within the environment (e.g., across multiple axes) based on the map data. For example, the positioning system 155 may process certain sensor data 310 (e.g., LIDAR data, camera data, etc.) to match it to a map of the surrounding environment to get an understanding of the vehicle's position within that environment. The determined position of the vehicle 105 may be used by various systems of the vehicle computing system 200 or another computing system (e.g., the remote computing platform 110, the third-party computing platform 125, the user device 115).

The vehicle 105 may include a communications unit 325 configured to allow the vehicle 105 (and its vehicle computing system 200) to communicate with other computing devices. The vehicle computing system 200 may use the communications unit 325 to communicate with the remote computing platform 110 or one or more other remote computing devices over a network 130 (e.g., via one or more wireless signal connections). For example, the vehicle computing system 200 may utilize the communications unit 325 to receive platform data 330 from the computing platform 110. This may include, for example, an over-the-air (OTA) software update for the operating system of the vehicle computing system 200. Additionally, or alternatively, the vehicle computing system 200 may utilize the communications unit 325 to send vehicle data 335 to the computing platform 110. The vehicle data 335 may include any data acquired onboard the vehicle including, for example, sensor data 310, location data 320, diagnostic data, user input data, data indicative of current software versions or currently running applications, occupancy data, data associated with the user 120 of the vehicle 105, or other types of data obtained (e.g., acquired, accessed, generated, downloaded, etc.) by the vehicle computing system 200.

In some implementations, the communications unit 325 may allow communication among one or more of the systems on-board the vehicle 105.

In an embodiment, the communications unit 325 may be configured to allow the vehicle 105 to communicate with or otherwise receive data from the user device 115 (shown in FIG. 1). The communications unit 325 may utilize various communication technologies such as, for example, Bluetooth low energy protocol, radio frequency signaling, or other short range or near field communication technologies. The communications unit 325 may include any suitable components for interfacing with one or more networks, including, for example, transmitters, receivers, ports, controllers, antennas, or other suitable components that may help facilitate communication.

The vehicle 105 may include one or more human-machine interfaces (HMIs) 340. The human-machine interfaces 340 may include a display device, as described herein. The display device (e.g., touchscreen) may be viewable by a user of the vehicle 105 (e.g., user 120) that is located in the front of the vehicle 105 (e.g., driver's seat, front passenger seat). Additionally, or alternatively, a display device (e.g., rear unit) may be viewable by a user that is located in the rear of the vehicle 105 (e.g., back passenger seats). The human-machine interfaces 340 may present content 335 via a user interface for display to a user 120.

Figure 3:
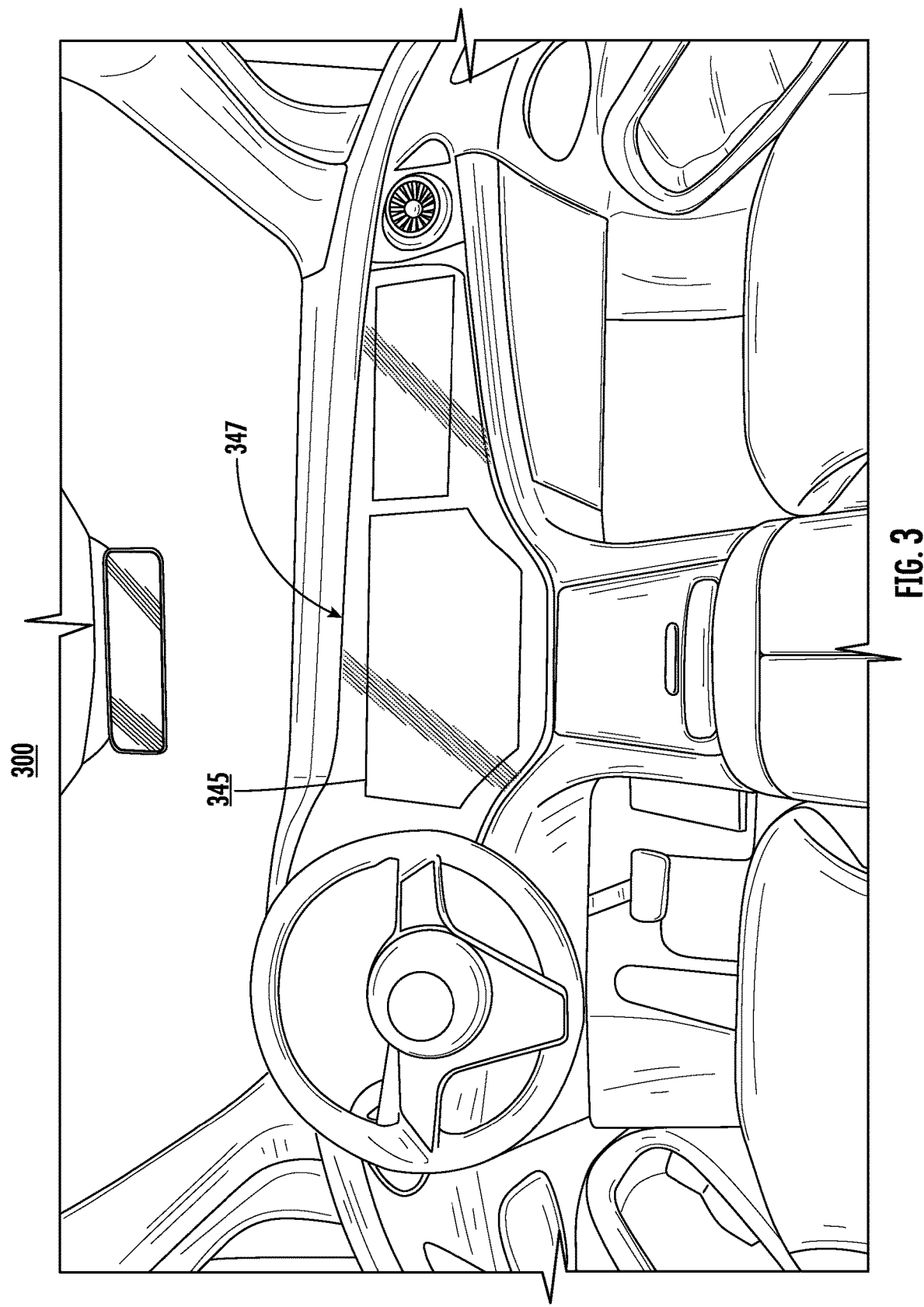
FIG. 3 illustrates an example vehicle interior with an example display according to an embodiment hereof.

FIG. 3 illustrates an example vehicle interior 300 with a display device 345. The display device 345 may be a component of the vehicle's head unit or infotainment system. Such a component may be referred to as a display device of the infotainment system or be considered as a device for implementing an embodiment that includes the use of an infotainment system. For illustrative and example purposes, such a component may be referred to herein as a head unit display device (e.g., positioned in a front/dashboard area of the vehicle interior), a rear unit display device (e.g., positioned in the back passenger area of the vehicle interior), an infotainment head unit or rear unit, or the like. The display device 345 may be located on, form a portion of, or function as a dashboard of the vehicle 105. The display device 345 may include a display screen, CRT, LCD, plasma screen, touch screen, TV, projector, tablet, or other suitable display components.

The display device may display a variety of content to the user 120 including information about the vehicle 105, prompts for user input, etc. The display device may include a touchscreen through which the user 120 may provide user input to a user interface.

For example, the display device 345 may include a user interface rendered via a touch screen that presents various content. The content may include vehicle speed, mileage, fuel level, charge range, navigation/routing information, audio selections, streaming content (e.g., video/image content), internet search results, comfort settings (e.g., temperature, humidity, seat position, seat massage), or other vehicle data 335. The display device 345 may render content to facilitate the receipt of user input. For instance, the user interface of the display device 345 may present one or more soft buttons with which a user 120 can interact to adjust various vehicle functions (e.g., navigation, audio/streaming content selection, temperature, seat position, seat massage, etc.). Additionally, or alternatively, the display device 345 may be associated with an audio input device (e.g., microphone) for receiving audio input from the user 120.

The vehicle 105 may include a plurality of vehicle functions 350A-C. A vehicle function 350A-C may be a functionality that the vehicle 105 is configured to perform based on a detected input. The vehicle functions 350A-C may include one or more: (i) vehicle comfort functions; (ii) vehicle staging functions; (iii) vehicle climate functions; (vi) vehicle navigation functions; (v) drive style functions; (v) vehicle parking functions; or (vi) vehicle entertainment functions. The user 120 may interact with a vehicle function 250A-C through user input (e.g., to an adjustable input device, UI element) that specifies a setting of the vehicle function 250A-C selected by the user.

Each vehicle function may include a controller 355A-C associated with that particular vehicle function 355A-C. The controller 355A-C for a particular vehicle function may include control circuitry configured to operate its associated vehicle function 355A-C. For example, a controller may include circuitry configured to turn the seat heating function on, to turn the seat heating function off, set a particular temperature or temperature level, etc.

In an embodiment, a controller 355A-C for a particular vehicle function may include or otherwise be associated with a sensor that captures data indicative of the vehicle function being turned on or off, a setting of the vehicle function, etc. For example, a sensor may be an audio sensor or a motion sensor. The audio sensor may be a microphone configured to capture audio input from the user 120. For example, the user 120 may provide a voice command to activate the radio function of the vehicle 105 and request a particular station. The motion sensor may be a visual sensor (e.g., camera), infrared, RADAR, etc. configured to capture a gesture input from the user 120. For example, the user 120 may provide a hand gesture motion to adjust a temperature function of the vehicle 105 to lower the temperature of the vehicle interior.

The controllers 355A-C may be configured to send signals to another onboard system. The signals may encode data associated with a respective vehicle function. The encoded data may indicate, for example, a function setting, timing, etc. In an example, such data may be used to generate content for presentation via the display device 345 (e.g., showing a current setting). Additionally, or alternatively, such data can be included in vehicle data 335 and transmitted to the computing platform 110.

Figure 4:
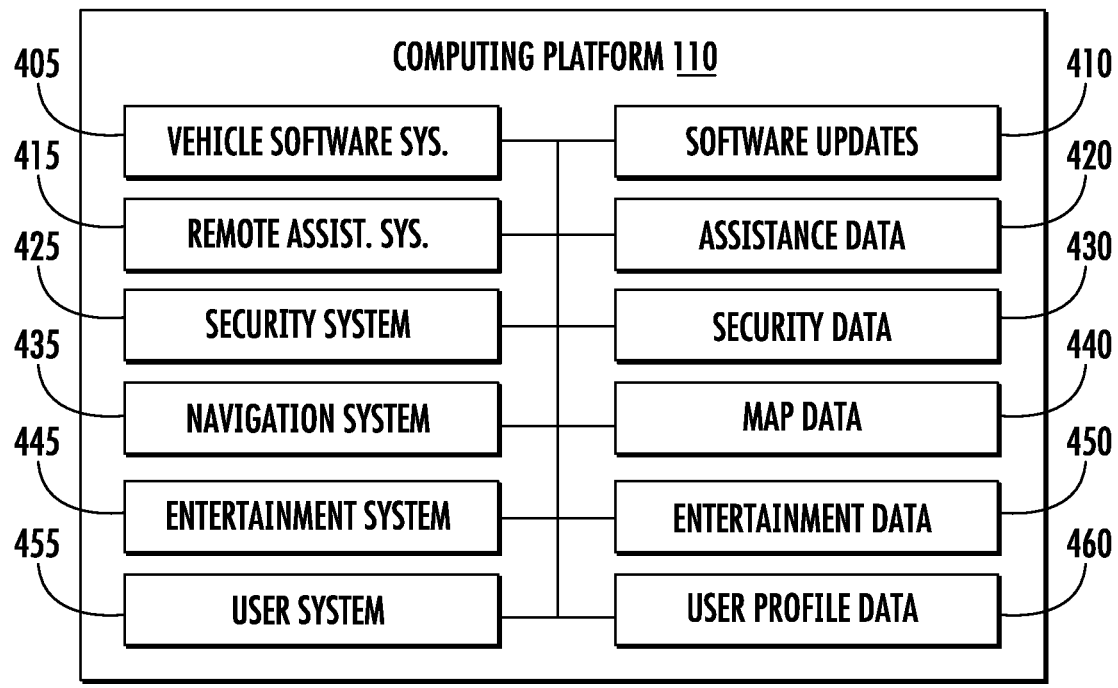
FIG. 4 illustrates a diagram of an example computing platform that is remote from a vehicle according to an embodiment hereof.

FIG. 4 illustrates a diagram of computing platform 110, which is remote from a vehicle according to an embodiment hereof. As described herein, the computing platform 110 may include a cloud-based computing platform. The computing platform 110 may be implemented on one or more servers and include, or otherwise have access to, one or more databases. In an example, the computing platform 110 may be implemented using different servers based on geographic region.

In some implementations, the computing platform 110 may include layered infrastructure that includes a plurality of layers. For instance, the computing platform 110 may include a cloud-based layer associated with functions such as security, automation, monitoring, and resource management. The computing platform 110 may include a cloud application platform layer associated with functions such as charging station functions, live traffic, vehicle functions, vehicle-sharing functions, etc. The computing platform 110 may include applications and services that are built on these layers.

The computing platform 110 may be a modular connected service platform that includes a plurality of services that are available to the vehicle 105. In an example, the computing platform 110 may include a container-based micro-services mesh platform. The services can be represented or implemented as systems within the computing platform 110.

In an example, the computing platform 110 may include a vehicle software system 405 that is configured to provide the vehicle 105 with one or more software updates 410. The vehicle software system 405 can maintain a data structure (e.g., list, table) that indicates the current software or versions thereof downloaded to a particular vehicle. The vehicle software system 405 may also maintain a data structure indicating software packages or versions that are to be downloaded by the particular vehicle. In some implementations, the vehicle computing system 405 may maintain a data structure that indicates the computing hardware, charging hardware, or other hardware resources onboard a particular vehicle. These data structures can be organized by vehicle identifier (e.g., VIN) such that the computing platform 110 can perform a look-up function, based on the vehicle identifier, to determine the associated software (and updates) for a particular vehicle.

When the vehicle 105 is connected to the computing platform 110 and is available to update its software, the vehicle 105 can request a software update from the computing platform. The computing platform 110 can provide the vehicle 105 one or more software updates 410 as over-the-air software updates via a network 130. According to example aspects of the present disclosure, however, the vehicle 105 can instead be provided with over-the-air software updates via a private network (e.g., a private cellular network) when the vehicle is in range of the private network. The vehicle 105 can connect to the private network (e.g., to a wireless access point broadcasting the private network) and be updated using an OTA software package from a local cache at the wireless access point. Furthermore, the vehicle 105 may believe it is connecting via the network 130 in some implementations, such that no further configuration is necessary at the vehicle 105.

The computing platform 110 may include a remote assistance system 415. The remote assistance system 415 may provide assistance to the vehicle 105. This can include providing information to the vehicle 105 to assist with charging (e.g., charging locations recommendations), remotely controlling the vehicle (e.g., for AV assistance), roadside assistance (e.g., for collisions, flat tires), etc. The remote assistance system 415 may obtain assistance data 420 to provide its core functions. The assistance data 420 may include information that may be helpful for the remote assistance system 415 to assist the vehicle 105. This may include information related to the vehicle's current state, an occupant's current state, the vehicle's location, the vehicle's route, charge/fuel level, incident data, etc. In some implementations, the assistance data 420 may include the vehicle data 335.

The remote assistance system 415 may transmit data or command signals to provide assistance to the vehicle 105. This may include providing data indicative of relevant charging locations, remote control commands to move the vehicle, connect to an emergency provider, etc.

The computing platform 110 may include a security system 425. The security system 425 can be associated with one or more security-related functions for accessing the computing platform 1110 or the vehicle 105. For instance, the security system 425 can process security data 430 for identifying digital keys, data encryption, data decryption, etc. for accessing the services/systems of the computing platform 110. Additionally, or alternatively, the security system 425 can store security data 430 associated with the vehicle 105. A user 120 can request access to the vehicle 105 (e.g., via the user device 115). In the event the request includes a digital key for the vehicle 105 as indicated in the security data 430, the security system 425 can provide a signal to lock (or unlock) the vehicle 105.

The computing platform 110 may include a navigation system 435 that provides a back-end routing and navigation service for the vehicle 105. The navigation system 435 may provide map data 440 to the vehicle 105. The map data 440 may be utilized by the positioning system 315 of the vehicle 105 to determine a location of the vehicle 105, a point of interest, etc. The navigation system 435 may also provide routes to destinations requested by the vehicle 105 (e.g., via user input to the vehicle's head unit). The routes can be provided as a portion of the map data 440 or as separate routing data. Data provided by the navigation system 435 can be presented as content on the display device 345 of the vehicle 105.

The computing platform 110 may include an entertainment system 445. The entertainment system 445 may access one or more databases for entertainment data 450 for a user 120 of the vehicle 105. In some implementations, the entertainment system 445 may access entertainment data 450 from another computing system (e.g., via an API) associated with a third-party service provider of entertainment content. The entertainment data 450 may include media content such as music, videos, gaming data, etc. The vehicle 105 may output the entertainment data 450 via one or more output devices of the vehicle 105 (e.g., display device, speaker, etc.).

The computing platform 110 may include a user system 455. The user system 455 may create, store, manage, or access user profile data 460. The user profile data 460 may include a plurality of user profiles, each associated with a respective user 120. A user profile may indicate various information about a respective user 120 including the user's preferences (e.g., for music, comfort settings), frequented/past destinations, past routes, etc. The user profiles may be stored in a secure database. In some implementations, when a user 120 enters the vehicle 120, the user's key (or user device) may provide a signal with a user or key identifier to the vehicle 105. The vehicle 105 may transmit data indicative of the identifier (e.g., via its communications system 325) to the computing platform 110. The computing platform 110 may look-up the user profile of the user 120 based on the identifier and transmit user profile data 460 to the vehicle computing system 200 of the vehicle 105. The vehicle computing system 200 may utilize the user profile data 460 to implement preferences of the user 120, present past destination locations, etc. The user profile data 460 may be updated based on information periodically provided by the vehicle 105. In some implementations, the user profile data 460 may be provided to the user device 120.

Figure 5:
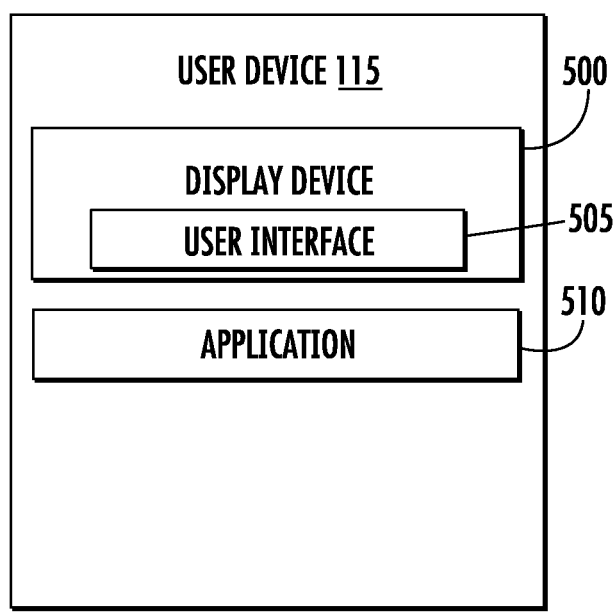
FIG. 5 illustrates a diagram of an example user device according to an embodiment hereof.

FIG. 5 illustrates a diagram of example components of user device 120 according to an embodiment hereof. The user device 120 may include a display device 500 configured to render content via a user interface 505 for presentation to a user 120. The display device 500 may include a display screen, CRT, LCD, plasma screen, touch screen, TV, projector, tablet, or other suitable display components. The user device 120 may include a software application 510 that is downloaded and runs on the user device 120. In some implementations, the software application 510 may be associated with the vehicle 105 or an entity associated with the vehicle 105 (e.g., manufacturer, retailer, maintenance provider). In an example, the software application 510 may enable the user device 120 to communicate with the computing platform 110 and the services thereof.

The technology of the present disclosure allows the vehicle computing system 200 to extend its computing capabilities by utilizing a private network associated with a particular location to perform OTA software updates. The private network can be associated with/established at a particular location frequented by a vehicle, such as, for example, an electric vehicle charging station, a dealership, and so on. As described herein, this technology can overcome potential drawbacks introduced by downloading OTA software updates directly to the vehicle 105 over the networks 130. Additionally, this technology can be implemented without requiring significant changes to configuration of the vehicle 105.

Figure 6:
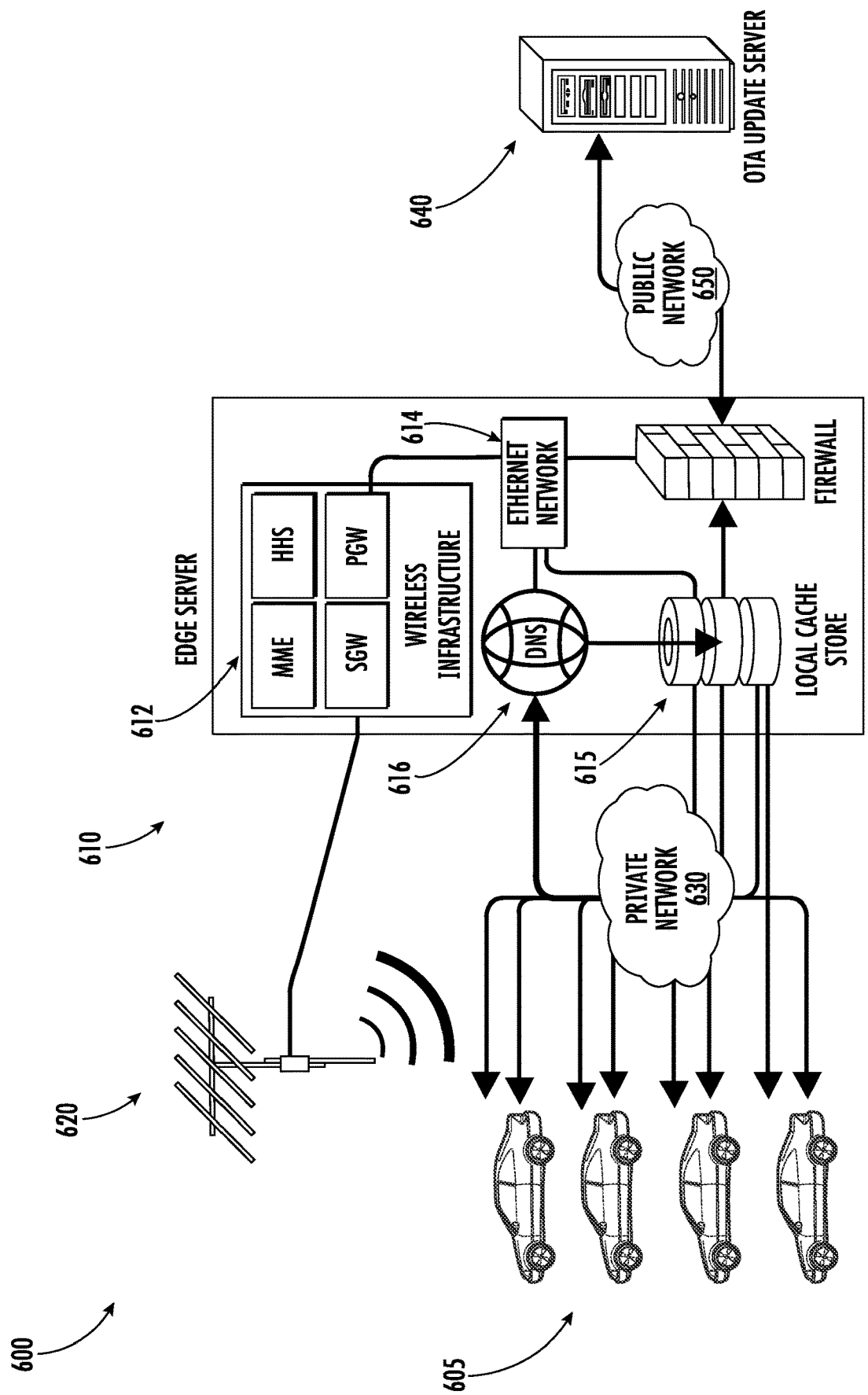
FIG. 6 illustrates an example system for providing OTA updates via private network(s) according to an embodiment hereof.

FIG. 6 illustrates an example system 600 for providing OTA updates via private network(s) according to an embodiment hereof. The system 600 can include an edge server 610. The edge server 610 can establish a private network 630 (e.g. a private cellular network) for communicating with one or more vehicles 605. In particular, the edge server 610 can include wireless infrastructure 612, such as, for example, a mobility management entity (MME) module configured to track, authorize, register, and otherwise manage user equipment registered on the private network 630, a home subscriber service (HSS) module providing a database of subscribers to the private network 630, a serving gateway (SGW) module configured to establish sessions between vehicles 605 and the edge server 610, or a packet data network gateway (PGW) module configured to provide access to packet data networks via the private network 630. Additionally or alternatively, the edge server 610 can include or otherwise communicate with one or more antennae 620 (e.g., LTE antennae) for establishing the private network 630. In addition or alternatively, the edge server 610 can include a domain name service (DNS) to manage domains on the private network 630.

The edge server 610 can include a local cache store 615. The local cache store 615 can store OTA software packages for the vehicles 605 as described further herein. The OTA software packages at the local cache store 615 can be indexed with respect to attributes of the OTA software packages, such as associated vehicle attributes (e.g., make, model, class, etc.), associated software versions, associated systems, and so on.

The edge server 610 can be in communication with an OTA update server 640 over a public network 650 (e.g., a public cellular network). The public network 650 can be any suitable network, such as, for example, a 3G network, a 4G LTE network, a 5G network, or any other suitable network, such as a cellular network. In some implementations, a firewall 618 can be established between the public network 650 and the edge server 610.

The OTA update server 640 can host OTA software packages associated with current or historical versions of software packages for various systems onboard a vehicle 605. As an example, the OTA update server 650 can host updated versions of software for sensor systems, positioning systems, communications systems, content delivery systems, or other systems for a vehicle 605. The software can be packaged into the OTA software packages such that the OTA software packages can be downloaded and implemented by a vehicle 605 to install or update that vehicle's software to the version included in the OTA software package.

Figure 7:
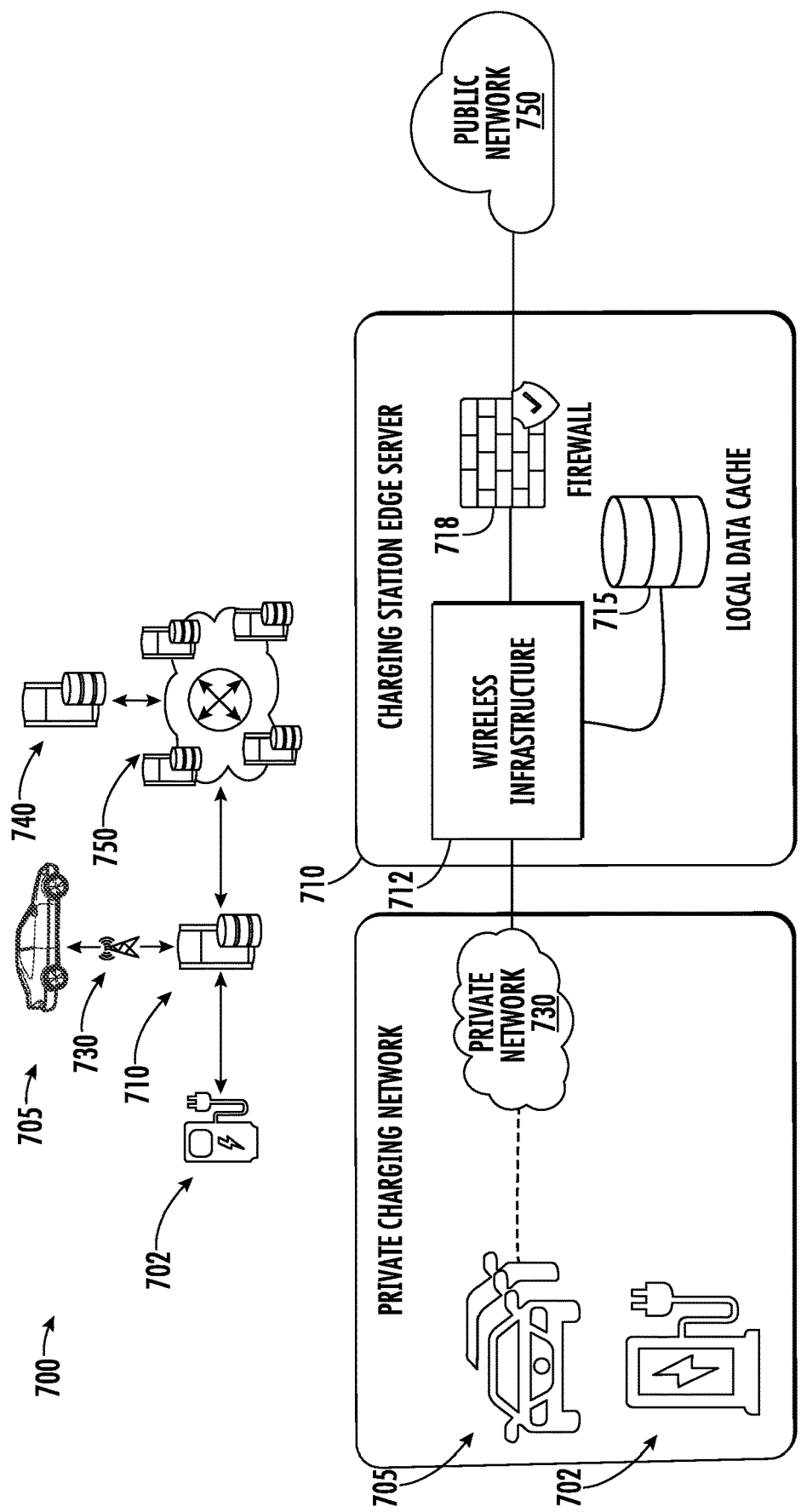
FIG. 7 illustrates an example system for providing OTA updates via private network(s) according to an embodiment hereof.

FIG. 7 illustrates an example system 700 for providing OTA updates via private network(s) according to an embodiment hereof. In particular, the system 700 includes a charging station edge server 710 provided as part of a charging station. The charging station can be configured to charge a vehicle 705, such as an electric vehicle. For instance, the charging station 702 can include one or more vehicle chargers 702 configured to supply power to a vehicle 705 for charging one or more batteries onboard the vehicle 705. The charging point edge server 710 can be configured to connect to the vehicle 705 (e.g., via the vehicle chargers 702) to obtain information about the vehicle 705. For example, the charging point edge server 710 can obtain information from the vehicle, such as error information associated with the vehicle, charge status of the vehicle (e.g., battery state of charge), identification information for the vehicle (e.g., vehicle identifier, make, model, year, class, etc.), or other suitable information.

The edge server 710 can be in communication with an OTA update server 740 over a public network 750 (e.g., a public cellular network). The public network 750 can be any suitable network, such as, for example, a 3G network, a 4G LTE network, a 5G network, or any other suitable network, such as a cellular network. In some implementations, a firewall 718 can be established between the public network 750 and the edge server 710.

Furthermore, according to example aspects of the present disclosure, the charging station edge server 710 can establish a private network 730 (e.g., a private cellular network) associated with the charging station. For instance, the charging station edge server 710 can include wireless infrastructure 712 (e.g., an MME module, a HSS module, a SGW module, a PGW module, a DNS module, etc.) to establish the private network 730.

The charging station edge server 710 can be configured to communicate with the vehicle 705 over the private network 730 to provide OTA software packages from local data cache 715 to the vehicle 705. The local cache store 715 can store OTA software packages for the vehicles 705 as described further herein. The OTA software packages at the local cache store 715 can be indexed with respect to attributes of the OTA software packages, such as associated vehicle attributes (e.g., make, model, class, etc.), associated software versions, associated systems, and so on.

FIG. 8 illustrates a flowchart diagram of an example method 800 for OTA updates via private network(s) according to an embodiment hereof. The method 800 may be performed by a computing system described with reference to the other figures. In an embodiment, the method 800 may be performed by the edge server 610 of FIG. 6. In an embodiment, the method 800 may be performed by the charging station edge server 710 of FIG. 7. One or more portions of the method 800 may be implemented as an algorithm on the hardware components of the devices described herein (e.g., as in FIGS. 6, 7, 9, etc.). For example, the steps of method 800 may be implemented as operations/instructions that are executable by computing hardware.

FIG. 8 illustrates elements performed in a particular order for purposes of illustration and discussion. Those of ordinary skill in the art, using the disclosures provided herein, will understand that the elements of any of the methods discussed herein may be adapted, rearranged, expanded, omitted, combined, or modified in various ways without deviating from the scope of the present disclosure. FIG. 8 is described with reference to elements/terms described with respect to other systems and figures for example illustrated purposes and is not meant to be limiting. One or more portions of method 800 may be performed additionally, or alternatively, by other systems. For example, one or more portions of method 800 may be performed by a control circuit of the computing platform 110, the vehicle computing system 200, or other suitable computing systems.

In an embodiment, the method 800 may begin with or otherwise include an operation 805, in which the computing system (e.g., edge server 610) obtains an OTA software package from an OTA update server 640 over a public cellular network 650. Additionally or alternatively, the method 800 in an embodiment may include an operation 810, in which the computing system (e.g., 610) stores the OTA software package at a local cache storage 615. For instance, the computing system (e.g., 610) can download or store OTA software packages from the OTA update server 640. The OTA update server 640 can host OTA software packages associated with current or historical versions of software packages for various systems onboard a vehicle 605. As an example, the OTA update server 640 can host updated versions of software for a vehicle computing system (e.g., 200), such as for sensor systems, positioning systems, communications systems, content delivery systems, or other systems for a vehicle 605 (e.g., a vehicle computing system).

The software can be packaged into the OTA software packages such that the OTA software packages can be downloaded and implemented by a vehicle 605 to install or update that vehicle's software to the version included in the OTA software package.

The computing system (e.g., 610) can obtain the OTA software package from the OTA update server 640 in any suitable manner. For instance, in some implementations, the computing system (e.g., 610) can regularly obtain updated versions of OTA software packages. As one example, the computing system (e.g., 610) can be configured to routinely update the OTA software packages for a given set of vehicles, such as a pre-specified set of vehicles. For instance, the computing system (e.g., 610) can include or store data (e.g., a list data structure or other similar data structure) indicative of a set of vehicles, such as identifiers corresponding to make, model, or other vehicle parameters, that the computing system (e.g., 610) is to maintain a cache of updated OTA software packages for at the local cache store 615. The computing system (e.g., 610) can query the OTA update server 640 to update the local cache store 615 to reflect updated OTA software packages available at the OTA update server 640.

As another example, in some implementations, the computing system (e.g., 610) can obtain the OTA software package as part of a response to a software update request associated with a prior vehicle. For instance, if the prior vehicle requests an OTA software package that is not yet available in the local cache storage of the computing system (e.g., 610), the computing system (e.g., 610) can download that OTA software package to be provided to the prior vehicle. In addition to or alternatively to providing the OTA software package to the prior vehicle, the computing system (e.g., 610) can cache the OTA software package at the local cache store 615 for future vehicles that request the OTA software package. In this manner, the computing system (e.g., 610) can prevent multiple downloads of the OTA software package over the public network 650.

The computing system (e.g., 610) or the local cache store 615 can be provided at a particular location. For instance, in some implementations, the computing system (e.g., 610) can be an edge server positioned at a particular location to provide the private network 630 at the particular location. The particular location can be strategically determined to provide access to the private network 630 to a class of vehicles.

As one example, the particular location can be a charging station (e.g., as in FIG. 7). For instance, the particular location can be a charging station such that the computing system (e.g., 610) is available to provide OTA software updates to electric vehicles while they charge at a charging station. A charging station can be an especially beneficial particular location for the computing system (e.g., 610) or local cache. In particular, vehicles charging at a charging station may generally remain at the charging station long enough such that any OTA software updates can be completed. Additionally or alternatively, because the vehicles are generally inactive at a charging station, the OTA software update can be completed without significant disruption to the users of the vehicles. Furthermore, because the vehicles are generally connected to a constant power supply while charging, providing OTA updates at a charging station can reduce the risk of any interrupted software downloads to the vehicles resulting from battery power loss.

As another example, the particular location can be a dealership. For instance, the particular location can be a dealership such that the computing system (e.g., 610) is available to provide OTA software updates to vehicles while the vehicles are available for sale at the dealership or while the vehicles are undergoing maintenance at the dealership. A dealership can be an especially beneficial particular location for the computing system or local cache. In particular, a large number of similar vehicles, such as vehicles having the same manufacturer, can be provided with OTA software updates in an efficient manner at the dealership. Additionally or alternatively, providing OTA software updates at a dealership can provide for vehicles sold by the dealership to be updated to the most up-to-date software versions at the time of sale, even if the onboard software has become outdated during delivery of the vehicles to the dealership. This, in turn, can improve the user experience of customers purchasing new vehicles from the dealership. Furthermore, vehicles undergoing maintenance at the dealership will generally remain at the dealership during maintenance for a long enough period of time such that the OTA software updates can be completed without significant disruption to the users of the vehicles.

The method 800 in an embodiment may include a step 815, in which the computing system (e.g., 610) determines that a vehicle 605 has connected to a private cellular network 630 associated with the particular location. For instance, the computing system (e.g., 610) can broadcast a private cellular network 630. In some implementations, the private cellular network 630 can be a radio access network (RAN). A radio access network can be a network utilizing radio access technology to provide connection between user equipment such as mobile devices, vehicles 605, etc. and a core network of the computing system (e.g., the ethernet network 614). Examples of radio access networks include, but are not limited to, GRAN, GERAN, UTRAN, and E-UTRAN.

The private cellular network 630 can be associated with the particular location such that the private cellular network 630 covers some or all of the particular location. For example, the private cellular network 630 can be established by an edge server at the particular location or configured to communicate with vehicles entering the particular location. As one example, the particular location can be a charging station 700, and the edge server 610 can be a charging station edge server 710 configured to communicate with electric vehicles 705 during charging of the electric vehicles 705. For instance, if the particular location is a charging station or the private cellular network 730 is established by a charging station edge server 710 at the charging station 700, the charging station edge server 710 can be configured to communicate with vehicles 705 entering the charging station 710.

To determine that the vehicle 605 has connected to the private cellular network 630, the vehicle 605 or the computing system (e.g., 610) can share one or more communications indicating that the vehicle 605 has connected to the private cellular network 630. As one example, the computing system (e.g., 610) can detect network traffic originating from the vehicle 605, such as traffic having a network address (e.g., an IP address, MAC address, etc.) associated with a vehicle computing system (e.g., 200) of the vehicle 605. As another example, the computing system (e.g., 610) and the vehicle 605 (e.g., the vehicle computing system 200) can share one or more handshake communications acknowledging successful connection between the vehicle 605 and the computing system (e.g., 610).

In some implementations, the vehicle 605 can include an embedded SIM (eSIM). The eSIM may be configured to connect to the public cellular network 650. An eSIM is a form of SIM card that can be embedded directly into a device (e.g., as opposed to a removable SIM card on an integrated circuit that is inserted into the device). For instance, the eSIM may be configured with one or more SIM profile attributes, such as ICCID, IMSI, network authentication key, etc. The eSIM can be reprogrammed or otherwise reconfigured while still embedded into the device with new SIM profile attributes.

In some implementations, the vehicle 605 or the SIM profile can be configured such that communications with the private cellular network 630 are prioritized over communications with the public cellular network 650. Additionally or alternatively, the private cellular network 630 can be configured such that vehicles configured to connect to the public cellular network 650 can instead connect to the private cellular network 630 when the vehicle 605 is in range of the private cellular network 630. For instance, in some implementations, the public cellular network 650 and the private cellular network 630 can share one or more SIM profile attributes such that communications with the private cellular network 630 are prioritized over communications with a public cellular network 650. For example, in some implementations, the vehicle 605 can be configured to connect to the strongest source of a network such that, if the vehicle 605 is in range of the private cellular network 630 and the public cellular network 650 each having common SIM profile attributes, the vehicle 605 may communicate with the private cellular network 630 because the private cellular network 630 is stronger, closer, or otherwise prioritized over the public cellular network 650. Furthermore, the vehicle 605 may not necessarily recognize that the private cellular network 630 and the public cellular network 650 are different networks. In this manner, aspects of the present disclosure can be implemented without requiring updates to existing vehicles and instead leveraging the existing communications systems in the vehicles that are capable of connecting to the public cellular network 650. Other suitable manners of rerouting network communications can be utilized herein without departing from the scope of the present disclosure.

The method 800 in an embodiment may include a step 820, in which the computing system (e.g., 610), in response to determining that the vehicle 605 has connected to the private cellular network 630 associated with the particular location, determines whether the vehicle 605 is eligible for the OTA software package stored at the local cache store 615. For instance, the computing system (e.g., 610) can verify that the vehicle 605 is able to implement the OTA software package. In some implementations, determining that the vehicle 605 is eligible for the OTA software package stored at the local cache store 615 can include receiving a software update request from the vehicle 605 over the private cellular network 630. The software update request can be or can include a communication from the vehicle 605 to a remote computing system (e.g., an update server or repository, such as OTA update server 640) requesting that the remote computing system provide a software update for the vehicle 605 as an OTA software package. According to aspects of the present disclosure, however, the computing system (e.g., the edge server 610) can respond directly to the software update request with an OTA software package from its local cache store 615 over the private network 630 in place of the OTA software package that can be downloaded over a public network 650, thereby preventing the utilization of network resources on the public network 650.

In some implementations, determining that the vehicle 605 is eligible for the OTA software package stored at the local cache store 615 can include determining whether the software update request is associated with the OTA software package. A software update request can be associated with an OTA software package. For instance, the software update request can include data indicative of a version associated with the OTA software package, a system associated with the OTA software package, a vehicle make, model, class, or other descriptor(s) associated with the OTA software package, a unique identifier associated with the OTA software package (e.g., a package identifier, hash, or other unique identifier), or other suitable data descriptive of a particular OTA software package. Determining whether the software update request is associated with the OTA software package can include comparing the software update request (e.g., the data descriptive of a particular OTA software package in the software update request) to the attributes of the OTA software package to determine whether the attributes of the OTA software package match those specified by the software update request.

In some implementations, the OTA software package can be associated with a vehicle model. For instance, the OTA software package may include software for a particular vehicle model (or models) that is not necessarily applicable to other models. To determine whether the vehicle 605 is eligible for the OTA software package stored at the local cache store 615, the computing system (e.g., 610) can determine a vehicle model based on a unique vehicle identifier and then determine, based on that vehicle model, whether the OTA software package is applicable to that vehicle 605.

For instance, the computing system (e.g., 610) can receive a vehicle identifier from the vehicle 605. The vehicle identifier can be uniquely associated with the vehicle 605. For instance, the vehicle identifier can be a serial number, license number, etc. such as a vehicle Identification Number (VIN) or a Globally Unique Identifier (GUID). The computing system (e.g., 610) can determine a vehicle model associated with the vehicle 605 based on the vehicle identifier. For instance, the computing system (e.g., 610) can look up the vehicle model associated with the vehicle identifier in a vehicle database. As one example, the vehicle database can include information such as vehicle make, model, etc. that is indexed relative to the vehicle identifier. The computing system (e.g., 610) can then determine that vehicle is eligible for the OTA software package based on the vehicle model being associated with the vehicle 605 and the OTA software package.

The method 800 in an embodiment may include a step 825, in which the computing system (e.g., 610) provides, over the private cellular network 630, the OTA software package stored at the local cache storage to the vehicle 605 based on determining that the vehicle 605 is eligible for the OTA software package. For instance, the computing system (e.g., 610) can provide the OTA software package as a file, as an executable file, as a file stream, or in any other suitable manner over the private network 630.

In some implementations, a user of the vehicle 605 must approve the OTA update prior to the computing system (e.g., 610) providing the OTA software package to the vehicle 605. For instance, in some implementations, the user may be prompted to approve or reject the OTA update prior to initiating the OTA update. The user may be provided with controls, such as by an infotainment system onboard the vehicle 605, an application on a mobile device associated with the user, etc., to approve or reject the OTA update. For instance, in some implementations, in response to determining that the vehicle 605 is eligible for the OTA software package, the computing system (e.g., 610) can provide a communication to the vehicle 605 indicating that the vehicle 605 is eligible for the OTA software package. In response to receiving the communication to the vehicle 605 indicating that the vehicle 605 is eligible for the OTA software package, the vehicle 605 can prompt the user to approve or reject the OTA update. Upon receiving user input indicating acceptance of the OTA update, the vehicle 605 can transmit a second communication to the computing system (e.g., 610) indicating that the user has approved the OTA update. In response to receiving the second communication, the computing system (e.g., 610) can provide the OTA software package over the private cellular network 630.

In some implementations, such as implementations where the particular location is a charging station, the computing system (e.g., 610) can determine whether to provide the OTA software package to the vehicle 605 based on a time-to-charge for the vehicle 605. For instance, the computing system (e.g., 610) can be incorporated into a charging station providing charging functionality for a vehicle 605. The computing system (e.g., 610) can initiate charging of the vehicle 605. For instance, the computing system (e.g., 610) may establish an initial state of charge (SoC) of a vehicle 605, may establish physical or signal communications with various onboard systems of the vehicle 605, may provide power over a vehicle charger, or may otherwise place the computing system (e.g., 610) or may otherwise place the vehicle in a state such that the state of charge at one or more batteries of the vehicle 605 is increasing.

Additionally or alternatively, the computing system (e.g., 610) can determine a time-to-charge for the vehicle 605. For instance, in some implementations, the computing system (e.g., 610) can determine an approximate time for the vehicle 605 to reach full charge. As one example, the computing system (e.g., 610) can utilize a battery charging model configured to estimate the time-to-charge based on battery parameters such as state of charge, voltage, charging current, capacity, etc. Additionally or alternatively, the computing system (e.g., 610) can determine an expected time that the vehicle 605 will remain charging (e.g., by machine-learned behavior modeling or other suitable approaches).

The computing system (e.g., 610) can then determine whether to provide the OTA software package to the vehicle 605 over the private cellular network 630 based on the time-to-charge for the vehicle 605. For instance, in some implementations, the computing system (e.g., 610) can determine an estimated update time indicative of an estimated time to implement (e.g., download or install) the OTA software package at the vehicle 605. The computing system (e.g., 610) can compare the estimated update time to the time-to-charge for the vehicle 605. If the time-to-charge exceeds the estimated update time, the computing system (e.g., 610) can determine to provide the OTA software package for the vehicle 605. If the estimated update time exceeds the time-to-charge for the vehicle 605, however, the computing system (e.g., 610) can determine not to provide the OTA software package for the vehicle 605.

In some implementations, the computing system (e.g., 610) can download and store multiple OTA software packages at the local cache store 615. For instance, in some implementations, the OTA software package is a first OTA software package. The computing system (e.g., 610) can further obtain a second OTA software package over the public cellular network 650. The computing system (e.g., 610) can further store the second OTA software package at the local cache store 615 at the particular location. The computing system (e.g., 610) can further provide, over the private cellular network 630, the second OTA software package to the vehicle 605. The second OTA software package may be associated with a same or different vehicle class, software version, system or subsystem, or other aspect from the first OTA software package.

In some implementations, in response to determining that the software update request is not associated with the OTA software package, the computing system (e.g., 610) can redirect the software update request to the OTA update server 640 over the public cellular network 650. In some implementations, the computing system (e.g., 610) can verify that the software update request is not associated with any OTA software package stored in the local cache store 615. For instance, the software update request may be associated with an OTA software package that has not yet been downloaded to the local cache store 615. In response to determining that the requested OTA software package is not available at the local cache store 615 (e.g., that the software update request is not associated with the OTA software package), the computing system (e.g., 610) can redirect the request over the public cellular network 650 (e.g., to the update server) to download the OTA software package to the computing system (e.g., 610) or store the OTA software package in the local cache. The computing system (e.g., 610) can then provide the downloaded OTA software package (e.g., from the local cache, from temporary memory, or from another suitable location) to the vehicle 605 over the private network 630.

The method 800 in an embodiment may optionally include a step 830, in which the computing system (e.g., 610) obtains, over the private cellular network 630, a confirmation that the vehicle 605 has implemented the OTA software package. For instance, a vehicle computing system (e.g., the vehicle computing system 200 of FIG. 2) may implement the OTA software package to update software on the vehicle computing system. Once the vehicle 605 has implemented the OTA software package (e.g., once the vehicle's software has successfully been updated), the vehicle 605 can transmit a confirmation (e.g., a confirmation message) to the computing system over the private cellular network 630.

The method 800 in an embodiment may include a step 835, in which the computing system (e.g., 610) provides, to update a shadow record of the vehicle 605, data indicating that the vehicle 605 has implemented the OTA software package. For instance, a computing system such as the computing platform 110 of FIG. 1 can maintain a shadow record of one or more vehicles (e.g., the vehicles 105). The shadow record can be a data structure (e.g., list, table, matrix) that stores information associated with a particular vehicle to reflect the past/historic state, current/present state, or a future state of the vehicle or its component(s). For example, the shadow record can indicate information of the vehicle such as vehicle identifiers, software versioning information, update status, and so on. Once the shadow record has been updated to indicate that the vehicle has implemented the OTA software package, the shadow record can be stored, deleted, or otherwise handled by the remote computing platform 110.

The method 800 can additionally include obtaining, over the private cellular network 630, vehicle data from the vehicle 605. In some implementations, the vehicle data can include error data associated with the vehicle 605. The error data associated with the vehicle 605 can indicate one or more errors in one or more systems of the vehicle 605. For instance, in some implementations, the error data can indicate diagnostic information (e.g., diagnostic codes) associated with the vehicle 605. Additionally or alternatively, in some implementations, the error data can indicate errors associated with implementing the OTA software package at the vehicle 605.

Figure 9:
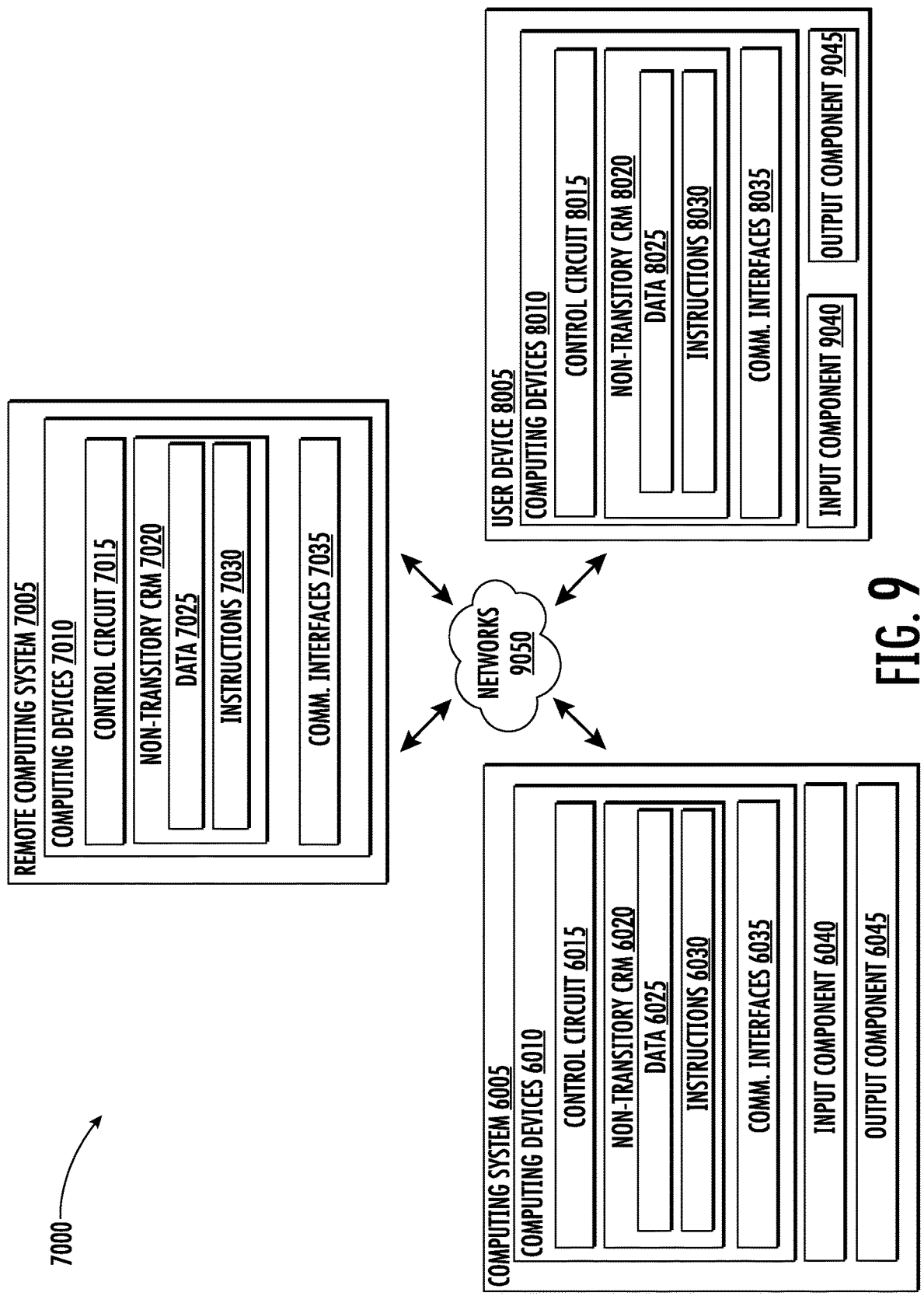
FIG. 9 illustrates a diagram of an example computing ecosystem with computing components according to an embodiment hereof.

FIG. 9 illustrates a block diagram of an example computing system 7000 according to an embodiment hereof. The system 7000 includes a computing system 6005 (e.g., a computing system onboard a vehicle), a server computing system 7005 (e.g., a remote computing system, cloud computing platform), and a user device 8005 that are communicatively coupled over one or more networks 9050.

The computing system 6005 may include one or more computing devices 6010 or circuitry. For instance, the computing system 6005 may include a control circuit 6015 and a non-transitory computer-readable medium 6020, also referred to herein as memory. In an embodiment, the control circuit 6015 may include one or more processors (e.g., microprocessors), one or more processing cores, a programmable logic circuit (PLC) or a programmable logic/gate array (PLA/PGA), a field programmable gate array (FPGA), an application specific integrated circuit (ASIC), or any other control circuit. In some implementations, the control circuit 6015 may be part of, or may form, a vehicle control unit (also referred to as a vehicle controller) that is embedded or otherwise disposed in a vehicle (e.g., a Mercedes-Benz® car or van). For example, the vehicle controller may be or may include an infotainment system controller (e.g., an infotainment head-unit), a telematics control unit (TCU), an electronic control unit (ECU), a central powertrain controller (CPC), a charging controller, a central exterior & interior controller (CEIC), a zone controller, or any other controller. In an embodiment, the control circuit 6015 may be programmed by one or more computer-readable or computer-executable instructions stored on the non-transitory computer-readable medium 6020.

In an embodiment, the non-transitory computer-readable medium 6020 may be a memory device, also referred to as a data storage device, which may include an electronic storage device, a magnetic storage device, an optical storage device, an electromagnetic storage device, a semiconductor storage device, or any suitable combination thereof. The non-transitory computer-readable medium 6020 may form, e.g., a hard disk drive (HDD), a solid state drive (SDD) or solid state integrated memory, a random access memory (RAM), a read-only memory (ROM), an erasable programmable read-only memory (EPROM or Flash memory), a static random access memory (SRAM), dynamic random access memory (DRAM), a portable compact disc read-only memory (CD-ROM), a digital versatile disk (DVD), or a memory stick.

The non-transitory computer-readable medium 6020 may store information that may be accessed by the control circuit 6015. For instance, the non-transitory computer-readable medium 6020 (e.g., memory devices) may store data 6025 that may be obtained, received, accessed, written, manipulated, created, or stored. The data 6025 may include, for instance, any of the data or information described herein. In some implementations, the computing system 6005 may obtain data from one or more memories that are remote from the computing system 6005.

The non-transitory computer-readable medium 6020 may also store computer-readable instructions 6030 that may be executed by the control circuit 6015. The instructions 6030 may be software written in any suitable programming language or may be implemented in hardware. The instructions may include computer-readable instructions, computer-executable instructions, etc. As described herein, in various embodiments, the terms "computer-readable instructions"

and "computer-executable instructions" are used to describe software instructions or computer code configured to carry out various tasks and operations. In various embodiments, if the computer-readable or computer-executable instructions form modules, the term "module" refers broadly to a collection of software instructions or code configured to cause the control circuit 6015 to perform one or more functional tasks. The modules and computer-readable/executable instructions may be described as performing various operations or tasks when the control circuit 6015 or other hardware component is executing the modules or computer-readable instructions.

The instructions 6030 may be executed in logically or virtually separate threads on the control circuit 6015. For example, the non-transitory computer-readable medium 6020 may store instructions 6030 that when executed by the control circuit 6015 cause the control circuit 6015 to perform any of the operations, methods or processes described herein. In some cases, the non-transitory computer-readable medium 6020 may store computer-executable instructions or computer-readable instructions, such as instructions to perform at least a portion of the method of FIG. 8.

The computing system 6005 may include one or more communication interfaces 6035. The communication interfaces 6035 may be used to communicate with one or more other systems. The communication interfaces 6035 may include any circuits, components, software, etc. for communicating via one or more networks (e.g., networks 9050). In some implementations, the communication interfaces 6035 may include for example, one or more of a communications controller, receiver, transceiver, transmitter, port, conductors, software or hardware for communicating data/information.

The computing system 6005 may also include one or more user input components 6040 that receives user input. For example, the user input component 6040 may be a touch-sensitive component (e.g., a touch-sensitive display screen or a touch pad) that is sensitive to the touch of a user input object (e.g., a finger or a stylus). The touch-sensitive component may serve to implement a virtual keyboard. Other example user input components include a microphone, a traditional keyboard, cursor-device, joystick, or other devices by which a user may provide user input.

The computing system 6005 may include one or more output components 6045. The output components 6045 may include hardware or software for audibly or visually producing content. For instance, the output components 6045 may include one or more speakers, carpieces, headsets, handsets, etc. The output components 6045 may include a display device, which may include hardware for displaying a user interface or messages for a user. By way of example, the output component 6045 may include a display screen, CRT, LCD, plasma screen, touch screen, TV, projector, tablet, or other suitable display components.

The server computing system 7005 may include one or more computing devices 7010. In an embodiment, the server computing system 7005 may include or is otherwise implemented by one or more server computing devices. In instances in which the server computing system 7005 includes plural server computing devices, such server computing devices may operate according to sequential computing architectures, parallel computing architectures, or some combination thereof.

The server computing system 7005 may include a control circuit 7015 and a non-transitory computer-readable medium 7020, also referred to herein as memory 7020. In an embodiment, the control circuit 7015 may include one or more processors (e.g., microprocessors), one or more processing cores, a programmable logic circuit (PLC) or a programmable logic/gate array (PLA/PGA), a field programmable gate array (FPGA), an application specific integrated circuit (ASIC), or any other control circuit. In an embodiment, the control circuit 7015 may be programmed by one or more computer-readable or computer-executable instructions stored on the non-transitory computer-readable medium 7020.

In an embodiment, the non-transitory computer-readable medium 7020 may be a memory device, also referred to as a data storage device, which may include an electronic storage device, a magnetic storage device, an optical storage device, an electromagnetic storage device, a semiconductor storage device, or any suitable combination thereof. The non-transitory computer-readable medium may form, e.g., a hard disk drive (HDD), a solid state drive (SDD) or solid state integrated memory, a random access memory (RAM), a read-only memory (ROM), an erasable programmable read-only memory (EPROM or Flash memory), a static random access memory (SRAM), dynamic random access memory (DRAM), a portable compact disc read-only memory (CD-ROM), a digital versatile disk (DVD), or a memory stick.

The non-transitory computer-readable medium 7020 may store information that may be accessed by the control circuit 7015. For instance, the non-transitory computer-readable medium 7020 (e.g., memory devices) may store data 7025 that may be obtained, received, accessed, written, manipulated, created, or stored. The data 7025 may include, for instance, any of the data or information described herein. In some implementations, the server system 7005 may obtain data from one or more memories that are remote from the server system 7005.

The non-transitory computer-readable medium 7020 may also store computer-readable instructions 7030 that may be executed by the control circuit 7015. The instructions 7030 may be software written in any suitable programming language or may be implemented in hardware. The instructions may include computer-readable instructions, computer-executable instructions, etc. As described herein, in various embodiments, the terms "computer-readable instructions" and "computer-executable instructions" are used to describe software instructions or computer code configured to carry out various tasks and operations. In various embodiments, if the computer-readable or computer-executable instructions form modules, the term "module" refers broadly to a collection of software instructions or code configured to cause the control circuit 7015 to perform one or more functional tasks. The modules and computer-readable/executable instructions may be described as performing various operations or tasks when the control circuit 7015 or other hardware component is executing the modules or computer-readable instructions.

The instructions 7030 may be executed in logically or virtually separate threads on the control circuit 7015. For example, the non-transitory computer-readable medium 7020 may store instructions 7030 that when executed by the control circuit 7015 cause the control circuit 7015 to perform any of the operations, methods or processes described herein. In some cases, the non-transitory computer-readable medium 7020 may store computer-executable instructions or computer-readable instructions, such as instructions to perform at least a portion of the method of FIG. 8.

The server computing system 7005 may include one or more communication interfaces 7035. The communication interfaces 7035 may be used to communicate with one or more other systems. The communication interfaces 7035 may include any circuits, components, software, etc. for communicating via one or more networks (e.g., networks 9050). In some implementations, the communication interfaces 7035 may include for example, one or more of a communications controller, receiver, transceiver, transmitter, port, conductors, software or hardware for communicating data/information.

The computing system 6005 or the server computing system 7005 may also be in communication with a user device 8005 that is communicatively coupled over the networks 9050.

The user device 8005 may include one or more computing devices 8010. The user device 8005 may include a control circuit 8015 and a non-transitory computer-readable medium 8020, also referred to herein as memory 8020. In an embodiment, the control circuit 8015 may include one or more processors (e.g., microprocessors), one or more processing cores, a programmable logic circuit (PLC) or a programmable logic/gate array (PLA/PGA), a field programmable gate array (FPGA), an application specific integrated circuit (ASIC), or any other control circuit. In an embodiment, the control circuit 8015 may be programmed by one or more computer-readable or computer-executable instructions stored on the non-transitory computer-readable medium 8020.

In an embodiment, the non-transitory computer-readable medium 8020 may be a memory device, also referred to as a data storage device, which may include an electronic storage device, a magnetic storage device, an optical storage device, an electromagnetic storage device, a semiconductor storage device, or any suitable combination thereof. The non-transitory computer-readable medium may form, e.g., a hard disk drive (HDD), a solid state drive (SDD) or solid state integrated memory, a random access memory (RAM), a read-only memory (ROM), an erasable programmable read-only memory (EPROM or Flash memory), a static random access memory (SRAM), dynamic random access memory (DRAM), a portable compact disc read-only memory (CD-ROM), a digital versatile disk (DVD), or a memory stick.

The non-transitory computer-readable medium 8020 may store information that may be accessed by the control circuit 8015. For instance, the non-transitory computer-readable medium 8020 (e.g., memory devices) may store data 8025 that may be obtained, received, accessed, written, manipulated, created, or stored. The data 8025 may include, for instance, any of the data or information described herein. In some implementations, the user device 8005 may obtain data from one or more memories that are remote from the user device 8005.

The non-transitory computer-readable medium 8020 may also store computer-readable instructions 8030 that may be executed by the control circuit 8015. The instructions 8030 may be software written in any suitable programming language or may be implemented in hardware. The instructions may include computer-readable instructions, computer-executable instructions, etc. As described herein, in various embodiments, the terms "computer-readable instructions" and "computer-executable instructions" are used to describe software instructions or computer code configured to carry out various tasks and operations. In various embodiments, if the computer-readable or computer-executable instructions form modules, the term "module" refers broadly to a collection of software instructions or code configured to cause the control circuit 8015 to perform one or more functional tasks. The modules and computer-readable/executable instructions may be described as performing various operations or tasks when the control circuit 8015 or other hardware component is executing the modules or computer-readable instructions.

The instructions 8030 may be executed in logically or virtually separate threads on the control circuit 8015. For example, the non-transitory computer-readable medium 8020 may store instructions 8030 that when executed by the control circuit 8015 cause the control circuit 8015 to perform any of the operations, methods or processes described herein. In some cases, the non-transitory computer-readable medium 8020 may store computer-executable instructions or computer-readable instructions, such as instructions to perform at least a portion of the method of FIG. 8.

The user device 8005 may include one or more communication interfaces 8035. The communication interfaces 8035 may be used to communicate with one or more other systems. The communication interfaces 8035 may include any circuits, components, software, etc. for communicating via one or more networks (e.g., networks 9050). In some implementations, the communication interfaces 8035 may include for example, one or more of a communications controller, receiver, transceiver, transmitter, port, conductors, software or hardware for communicating data/information.

The user device 8005 may also include one or more user input components 8040 that receives user input. For example, the user input component 8040 may be a touch-sensitive component (e.g., a touch-sensitive display screen or a touch pad) that is sensitive to the touch of a user input object (e.g., a finger or a stylus). The touch-sensitive component may serve to implement a virtual keyboard. Other example user input components include a microphone, a traditional keyboard, cursor-device, joystick, or other devices by which a user may provide user input.

The user device 8005 may include one or more output components 8045. The output components 8045 may include hardware or software for audibly or visually producing content. For instance, the output components 8045 may include one or more speakers, carpieces, headsets, handsets, etc. The output components 8045 may include a display device, which may include hardware for displaying a user interface or messages for a user. By way of example, the output component 8045 may include a display screen, CRT, LCD, plasma screen, touch screen, TV, projector, tablet, or other suitable display components.

The one or more networks 9050 may be any type of communications network, such as a local area network (e.g., intranet), wide area network (e.g., Internet), or some combination thereof and may include any number of wired or wireless links. In general, communication over a network 7050 may be carried via any type of wired or wireless connection, using a wide variety of communication protocols (e.g., TCP/IP, HTTP, SMTP, FTP), encodings or formats (e.g., HTML, XML), or protection schemes (e.g., VPN, secure HTTP, SSL).

Additional Discussion of Various Embodiments

Embodiment 1 relates to a computer-implemented method. The computer-implemented method may include obtaining an OTA software package from an OTA update server over a public cellular network. The computer-implemented method may include storing the OTA software package at a local cache storage at a particular location. The computer-implemented method may include determining that a vehicle has connected to a private cellular network associated with the particular location. The computer-implemented method may include, in response to determining that the vehicle has connected to the private cellular network associated with the particular location, determining whether the vehicle is eligible for the OTA software package stored at the local cache storage. The computer-implemented method may include providing, over the private cellular network, the OTA software package stored at the local cache storage to the vehicle based on determining that the vehicle is eligible for the OTA software package.

Embodiment 2 includes the computer-implemented method of Embodiment 1. In this embodiment, determining that the vehicle is eligible for the OTA software package stored at the local cache storage can include: receiving a software update request from the vehicle over the private cellular network; and determining whether the software update request is associated with the OTA software package.

Embodiment 3 includes the computer-implemented method of any of embodiments 1 or 2. In this embodiment, the method further includes, in response to determining that the software update request is not associated with the OTA software package, redirecting the software update request to the OTA update server over the public cellular network.

Embodiment 4 includes the computer-implemented method of any of embodiments 1 to 3. In this embodiment, the OTA software package is a first OTA software package, and the method further includes: obtaining a second OTA software package over the public cellular network; storing the second OTA software package at the local cache storage at the particular location; and providing, over the private cellular network, the second OTA software package to the vehicle.

Embodiment 5 includes the computer-implemented method of any of embodiments 1 to 4. In this embodiment, the particular location is a charging station, the private cellular network is established by a charging station edge server at the charging station, and the charging station edge server is configured to communicate with vehicles entering the charging station.

Embodiment 6 includes the computer-implemented method of any of embodiments 1 to 5. In this embodiment, the method includes initiating charging of the vehicle; determining a time-to-charge for the vehicle; and determining whether to provide the OTA software package to the vehicle over the private cellular network based on the time-to-charge for the vehicle.

Embodiment 7 includes the computer-implemented method of any of embodiments 1 to 6. In this embodiment, the method further includes obtaining, over the private cellular network, vehicle data from the vehicle.

Embodiment 8 includes the computer-implemented method of any of embodiments 1 to 7. In this embodiment, the vehicle data includes error data associated with the vehicle.

Embodiment 9 includes the computer-implemented method of any of embodiments 1 to 8. In this embodiment, the OTA software package is associated with a vehicle model, and determining whether the vehicle is eligible for the OTA software package stored at the local cache storage includes: receiving a vehicle identifier from the vehicle, the vehicle identifier uniquely associated with the vehicle; determining a vehicle model associated with the vehicle based on the vehicle identifier; and determining that vehicle is eligible for the OTA software package based on the vehicle model being associated with the vehicle and the OTA software package.

Embodiment 10 includes the computer-implemented method of any of embodiments 1 to 9. In this embodiment, the vehicle identifier can include at least one of a Vehicle Identification Number (VIN) or a Globally Unique Identifier (GUID), and determining the vehicle model associated with the vehicle based on the vehicle identifier includes looking up the vehicle model associated with the vehicle identifier in a vehicle database.

Embodiment 11 includes the computer-implemented method of any of embodiments 1 to 10. In this embodiment, the method further includes obtaining, over the private cellular network, a confirmation that the vehicle has implemented the OTA software package; and providing, to update a shadow record of the vehicle, data indicating that the vehicle has implemented the OTA software package.

Embodiment 12 includes the computer-implemented method of any of embodiments 1 to 11. In this embodiment, the public cellular network and the private cellular network share one or more SIM profile attributes such that communications with the private cellular network are prioritized over communications with a public cellular network.

Embodiment 13 includes the computer-implemented method of any of embodiments 1 to 12. In this embodiment, the vehicle includes an embedded SIM (eSIM).

Embodiment 14 includes the computer-implemented method of any of embodiments 1 to 13. In this embodiment, the private cellular network is a radio access network (RAN).

For example, in an aspect, computing system. The computing system includes a local cache storage. The computing system includes a communications system configured to establish a private cellular network associated with a particular location. The computing system includes a control circuit. The control circuit is configured to obtain an OTA software package from an OTA update server over a public cellular network. The control circuit is configured to store the OTA software package at the local cache storage at the particular location. The control circuit is configured to determine that a vehicle has connected to the private cellular network. The control circuit is configured to, in response to determining that the vehicle has connected to the private cellular network, determine whether the vehicle is eligible for the OTA software package stored at the local cache storage. The control circuit is configured to provide, over the private cellular network, the OTA software package stored at the local cache storage to the vehicle based on determining that the vehicle is eligible for the OTA software package.

Embodiment 16 includes the computing system of embodiment 15. In this embodiment, determining that the vehicle is eligible for the OTA software package stored at the local cache storage includes: receiving a software update request from the vehicle over the private cellular network; and determining whether the software update request is associated with the OTA software package.

Embodiment 17 includes the computing system of any of embodiments 15 or 16. In this embodiment, the public cellular network and the private cellular network share one or more SIM profile attributes such that communications with the private cellular network are prioritized over communications with a public cellular network.

Embodiment 18 includes the computing system of any of embodiments 15 to 17. In this embodiment, the vehicle includes an embedded SIM (eSIM) having the one or more SIM profile attributes.

Embodiment 19 includes the computing system of any of embodiments 15 to 18. In this embodiment, the control circuit is configured to: initiate charging of the vehicle;

determine a time-to-charge for the vehicle; and determine whether to provide the OTA software package to the vehicle over the private cellular network based on the time-to-charge for the vehicle.

Embodiment 20 relates to one or more non-transitory computer-readable media storing instructions that are executable by a control circuit. The instructions are executable by the control circuit to obtain an OTA software package from an OTA update server over a public cellular network. The instructions are executable by the control circuit to store the OTA software package at the local cache storage at the particular location. The instructions are executable by the control circuit to determine that a vehicle has connected to the private cellular network. The instructions are executable by the control circuit to, in response to determining that the vehicle has connected to the private cellular network, determine whether the vehicle is eligible for the OTA software package stored at the local cache storage. The instructions are executable by the control circuit to provide, over the private cellular network, the OTA software package stored at the local cache storage to the vehicle based on determining that the vehicle is eligible for the OTA software package.

Additional Disclosure

As used herein, adjectives and their possessive forms are intended to be used interchangeably unless apparent otherwise from the context or expressly indicated. For instance, "component of a/the vehicle" may be used interchangeably with "vehicle component" where appropriate. Similarly, words, phrases, and other disclosure herein is intended to cover obvious variants and synonyms even if such variants and synonyms are not explicitly listed.

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein may be implemented using a single device or component or multiple devices or components working in combination. Databases and applications may be implemented on a single system or distributed across multiple systems. Distributed components may operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, may readily produce alterations to, variations of, and equivalents to such embodiments. Accordingly, the subject disclosure does not preclude inclusion of such modifications, variations or additions to the present subject matter as would be readily apparent to one of ordinary skill in the art. For instance, features illustrated or described as part of one embodiment may be used with another embodiment to yield a still further embodiment. Thus, it is intended that the present disclosure cover such alterations, variations, and equivalents.

Aspects of the disclosure have been described in terms of illustrative implementations thereof. Numerous other implementations, modifications, or variations within the scope and spirit of the appended claims may occur to persons of ordinary skill in the art from a review of this disclosure. Any and all features in the following claims may be combined or rearranged in any way possible. Accordingly, the scope of the present disclosure is by way of example rather than by way of limitation, and the subject disclosure does not preclude inclusion of such modifications, variations or additions to the present subject matter as would be readily apparent to one of ordinary skill in the art. Moreover, terms are described herein using lists of example elements joined by conjunctions such as "and," "or," "but," etc. It should be understood that such conjunctions are provided for explanatory purposes only. The term "or" and "and/or" may be used interchangeably herein. Lists joined by a particular conjunction such as "or," for example, may refer to "at least one of" or "any combination of" example elements listed therein, with "or" being understood as "and/or" unless otherwise indicated. Also, terms such as "based on" should be understood as "based at least in part on."

Those of ordinary skill in the art, using the disclosures provided herein, will understand that the elements of any of the claims, operations, or processes discussed herein may be adapted, rearranged, expanded, omitted, combined, or modified in various ways without deviating from the scope of the present disclosure. At times, elements may be listed in the specification or claims using a letter reference for exemplary illustrated purposes and is not meant to be limiting. Letter references, if used, do not imply a particular order of operations or a particular importance of the listed elements. For instance, letter identifiers such as (a), (b), (c), . . . , (i), (ii), (iii), . . . , etc. may be used to illustrate operations or different elements in a list. Such identifiers are provided for the ease of the reader and do not denote a particular order, importance, or priority of steps, operations, or elements. For instance, an operation illustrated by a list identifier of (a), (i), etc. may be performed before, after, or in parallel with another operation illustrated by a list identifier of (b), (ii), etc.

What is claimed is:

1. A computer-implemented method comprising:
    obtaining an OTA software package from an OTA update server over a public cellular network;
    storing the OTA software package at a local cache storage at a particular location;
    determining that a vehicle has connected to a private cellular network associated with the particular location;
    in response to determining that the vehicle has connected to the private cellular network associated with the particular location, determining whether the vehicle is eligible for the OTA software package stored at the local cache storage; and
    providing, over the private cellular network, the OTA software package stored at the local cache storage to the vehicle based on determining that the vehicle is eligible for the OTA software package.

2. The computer-implemented method of claim 1, wherein determining that the vehicle is eligible for the OTA software package stored at the local cache storage comprises:
    receiving a software update request from the vehicle over the private cellular network; and
    determining whether the software update request is associated with the OTA software package.

3. The computer-implemented method of claim 2, further comprising:
    in response to determining that the software update request is not associated with the OTA software package, redirecting the software update request to the OTA update server over the public cellular network.

4. The computer-implemented method of claim 3, wherein the OTA software package is a first OTA software package, and wherein the method further comprises:
obtaining a second OTA software package over the public cellular network;
storing the second OTA software package at the local cache storage at the particular location; and
providing, over the private cellular network, the second OTA software package to the vehicle.

5. The computer-implemented method of claim 1, wherein the particular location is a charging station, wherein the private cellular network is established by a charging station edge server at the charging station, and wherein the charging station edge server is configured to communicate with vehicles entering the charging station.

6. The computer-implemented method of claim 5, further comprising:
initiating charging of the vehicle;
determining a time-to-charge for the vehicle; and
determining whether to provide the OTA software package to the vehicle over the private cellular network based on the time-to-charge for the vehicle.

7. The computer-implemented method of claim 1, further comprising:
obtaining, over the private cellular network, vehicle data from the vehicle.

8. The computer-implemented method of claim 7, wherein the vehicle data comprises error data associated with the vehicle.

9. The computer-implemented method of claim 1, wherein the OTA software package is associated with a vehicle model, and wherein determining whether the vehicle is eligible for the OTA software package stored at the local cache storage comprises:
receiving a vehicle identifier from the vehicle, the vehicle identifier uniquely associated with the vehicle;
determining a vehicle model associated with the vehicle based on the vehicle identifier; and
determining that vehicle is eligible for the OTA software package based on the vehicle model being associated with the vehicle and the OTA software package.

10. The computer-implemented method of claim 9, wherein the vehicle identifier comprises at least one of a Vehicle Identification Number (VIN) or a Globally Unique Identifier (GUID), and wherein determining the vehicle model associated with the vehicle based on the vehicle identifier comprises looking up the vehicle model associated with the vehicle identifier in a vehicle database.

11. The computer-implemented method of claim 1, further comprising:
obtaining, over the private cellular network, a confirmation that the vehicle has implemented the OTA software package; and
providing, to update a shadow record of the vehicle, data indicating that the vehicle has implemented the OTA software package.

12. The computer-implemented method of claim 1, wherein the public cellular network and the private cellular network share one or more SIM profile attributes such that communications with the private cellular network are prioritized over communications with a public cellular network.

13. The computer-implemented method of claim 1, wherein the vehicle comprises an embedded SIM (eSIM).

14. The computer-implemented method of claim 1, wherein the private cellular network is a radio access network (RAN).

15. A computing system, comprising:
a local cache storage;
a communications system configured to establish a private cellular network associated with a particular location; and
a control circuit configured to:
obtain an OTA software package from an OTA update server over a public cellular network;
store the OTA software package at the local cache storage at the particular location;
determine that a vehicle has connected to the private cellular network;
in response to determining that the vehicle has connected to the private cellular network, determine whether the vehicle is eligible for the OTA software package stored at the local cache storage; and
provide, over the private cellular network, the OTA software package stored at the local cache storage to the vehicle based on determining that the vehicle is eligible for the OTA software package.

16. The computing system of claim 15, wherein determining that the vehicle is eligible for the OTA software package stored at the local cache storage comprises:
receiving a software update request from the vehicle over the private cellular network; and
determining whether the software update request is associated with the OTA software package.

17. The computing system of claim 15, wherein the public cellular network and the private cellular network share one or more SIM profile attributes such that communications with the private cellular network are prioritized over communications with a public cellular network.

18. The computing system of claim 17, wherein the vehicle comprises an embedded SIM (eSIM) comprising the one or more SIM profile attributes.

19. The computing system of claim 15, wherein the control circuit is configured to:
initiate charging of the vehicle;
determine a time-to-charge for the vehicle; and
determine whether to provide the OTA software package to the vehicle over the private cellular network based on the time-to-charge for the vehicle.

20. One or more non-transitory computer-readable media comprising instructions that are executable by a control circuit to:
obtain an OTA software package from an OTA update server over a public cellular network;
store the OTA software package at the local cache storage at the particular location;
determine that a vehicle has connected to the private cellular network;
in response to determining that the vehicle has connected to the private cellular network, determine whether the vehicle is eligible for the OTA software package stored at the local cache storage; and
provide, over the private cellular network, the OTA software package stored at the local cache storage to the vehicle based on determining that the vehicle is eligible for the OTA software package.

* * * * *